United States Patent
Nakamura et al.

(10) Patent No.: US 6,172,132 B1
(45) Date of Patent: Jan. 9, 2001

(54) ANTIFOULING COATING COMPOSITION, COATING FILM FORMED FROM SAID ANTIFOULDING COATING COMPOSITION, ANTIFOULING METHOD USING SAID ANTIFOULING COATING COMPOSITION AND HULL OR UNDERWATER STRUCTURE COATED WITH SAID COATING FILM

(75) Inventors: Naoya Nakamura; Yasuto Hikiji; Yasuyuki Kiseki; Makoto Tsuboi, all of Ohtake (JP)

(73) Assignee: CHUGOKO Marine Paints Ltd, Hiroshima (JP)

(*) Notice: Under 35 U.S.C. 154(b), the term of this patent shall be extended for 0 days.

(21) Appl. No.: 09/089,516

(22) Filed: Jun. 3, 1998

Related U.S. Application Data

(63) Continuation of application No. 08/776,662, filed as application No. PCT/JP96/01479 on May 31, 1996.

(30) Foreign Application Priority Data

| Jun. 1, 1995 | (JP) | 7-135503 |
| Jun. 1, 1995 | (JP) | 7-135504 |
| Jun. 1, 1995 | (JP) | 7-135505 |
| Jun. 1, 1995 | (JP) | 7-135506 |
| Nov. 15, 1995 | (JP) | 7-297225 |

(51) Int. Cl.$^7$ .................................................. C08K 6/00
(52) U.S. Cl. ................................... 523/122; 524/472
(58) Field of Search ........................ 523/122; 524/472; 106/18.29

(56) References Cited

U.S. PATENT DOCUMENTS

| Re. 30,909 | 4/1982 | Law et al. ........................ 524/857 |
| 3,639,653 | 2/1972 | Clark et al. . |
| 3,896,753 | 7/1975 | Shepherd et al. ................. 523/122 |
| 4,021,392 | 5/1977 | Milne et al. . |
| 4,115,130 * | 9/1978 | Crump et al. ........................ 106/18 |
| 4,129,610 | 12/1978 | Kobayashi et al. . |
| 4,143,015 | 3/1979 | Soeterik . |
| 4,189,408 * | 2/1980 | Yaggi ................................ 524/412 |
| 4,385,134 | 5/1983 | Foscante et al. .................. 523/177 |
| 4,410,363 * | 10/1983 | Supcoe et al. ................... 106/18.29 |
| 4,593,055 | 6/1986 | Gitlitz et al. . |
| 4,594,365 | 6/1986 | Russell et al. . |
| 4,650,826 | 3/1987 | Waniczek et al. . |
| 4,670,481 | 6/1987 | Foscante et al. .................. 523/122 |
| 4,752,629 | 6/1988 | Proudlock et al. . |
| 4,774,080 | 9/1988 | Yamamori et al. . |
| 4,898,895 * | 2/1990 | Masuoka et al. ................. 523/122 |
| 4,957,989 | 9/1990 | Saitoh . |
| 5,080,892 | 1/1992 | Yamamori et al. . |
| 5,116,611 * | 5/1992 | Masuoka et al. ................. 523/122 |
| 5,236,493 | 8/1993 | Hunter et al. . |
| 5,266,105 | 11/1993 | Tsuneta et al. . |
| 5,374,665 | 12/1994 | Isaka et al. ....................... 523/122 |
| 5,436,284 | 7/1995 | Honda et al. . |
| 5,439,957 | 8/1995 | Takimoto et al. ................. 524/101 |
| 5,514,731 | 5/1996 | Nakai ................................ 523/122 |
| 5,663,215 * | 9/1997 | Milligan ............................ 523/122 |
| 5,795,374 | 4/1997 | Ito et al. ............................ 106/16 |

FOREIGN PATENT DOCUMENTS

| 0364272 | 10/1989 | (EP) . |
| 8824003 | 4/1990 | (EP) . |
| 0651034 | 5/1995 | (EP) . |
| 2192400 | 1/1988 | (GB) . |
| 2196869 | 8/1990 | (JP) . |
| 8402915 | 8/1984 | (WO) . |
| 9114743 | 10/1991 | (WO) . |

OTHER PUBLICATIONS

Derwent Japanese Patent Abstract JP–A–7 18216.
Derwent Japanese Patent Abstract JP–A–6 157940.
Derwent Japanese Patent Abstract JP–A–6 25560.
Derwent Japanese Patent Abstract JP–A–4 264168.
Derwent Japanese Patent Abstract JP–A–4 264169.
Derwent Japanese Patent Abstract JP–A–4 264170.
Derwent Japanese Patent Abstract JP–A–60 500452.
Masao Kodama and two others Paint and Coating, Jul. 30, 1973.
Sakura Yamada "Plastic Compounding Agent–Basis and Application", Jul. 10, 1971.
Akira Okina and three others "Paints Pigments", Aug. 30, 1960.
Derwent Japanese Patent Abstract JP–A–62 57464.
Patent Abstract of Japan JP–A–63 215780, published Sep. 8, 1988.
Derwent Japanese Patent Abstract JP–A–7 102193.
Derwent Japanese Patent Abstract JP–A–6 157941.
Derwent Japanese Patent Abstract JP 60 065076.

* cited by examiner

Primary Examiner—Veronica P. Hoke

(57) ABSTRACT

An antifouling coating composition can inhibit or prevent fouling of hulls of ships and other underwater structures. The coating composition includes (A) an antifouling agent, (B) a film-forming copolymer having a number average molecular weight of 1,000 to 50,000, and structural units derived from a trialkylsilyl ester of polymerizable unsaturated carboxylic acid in an amount of 20 to 65% by weight, based on the copolymer, and (C) chlorinated paraffin having 8 to 30 carbon atoms, number average molecular weight of 200 to 1200 and a chlorination ratio of from 35 to 75% by weight. Zinc flower may also be included in the antifouling coating composition in place of or in addition to the antifouling agent (A).

26 Claims, No Drawings

ANTIFOULING COATING COMPOSITION, COATING FILM FORMED FROM SAID ANTIFOULDING COATING COMPOSITION, ANTIFOULING METHOD USING SAID ANTIFOULING COATING COMPOSITION AND HULL OR UNDERWATER STRUCTURE COATED WITH SAID COATING FILM

CROSS-REFERENCE TO RELATED APPLICATIONS

This application is a continuation of copending application Ser. No. 08/776,662, filed Jan. 30, 1997, which in turn is the Section 371 Entry into the United States of International Application PCT/JP96/01479, filed May 31, 1996.

TECHNICAL FIELD

The present invention relates to an antifouling coating composition, a coating film formed from this antifouling coating composition, an antifouling method using the antifouling coating composition and a hull or an underwater structure coated with the above coating film.

More particularly, the present invention is concerned with an antifouling coating composition which enables providing a coating film being excellent in cracking resistance and having self-polishing properties such that the adherence of aquatic organism to ship bottoms, underwater structures, fishing nets, etc. can effectively prevented and is further concerned with a coating film formed from this antifouling coating composition, an antifouling method using the antifouling coating composition and a hull or an underwater structure coated with the above coating film.

Moreover, the present invention is concerned with an antifouling coating composition capable of forming a coating film with excellent strength, especially, a coating film being excellent in cracking and peeling resistances in an environment in which dry and wet conditions alternate with each other (zone under alternate dry and wet), for example, being excellent in cracking and peeling resistances at water lines of ships or in the vicinity of underwater structure drafts where immersion in the seawater and exposure to the air alternate with each other (zone under alternate dry and wet), and is further concerned with a coating film formed from this antifouling coating composition, an antifouling method using the antifouling coating composition and a hull or an underwater structure coated with the above coating film.

BACKGROUND ART

Ship bottoms, underwater structures, fishing nets and the like are likely to have their appearance and function damaged by the adhesion to surface and propagation of various aquatic organisms including animals such as shellfishes and barnacles, seaweeds such as layer and bacteria caused when they are exposed to the water for a prolonged period of time.

In particular, when the above aquatic organism adheres to a ship's bottom and propagates, the danger is highly probable that the roughness of the entire surface of the ship is increased to thereby lower the speed of the ship and increase the fuel consumed by the ship. Removing the aquatic organism from the ship bottom necessitates spending of much labor and working time at a dock. Further, when bacteria adhere to, for example, an underwater structure and propagates to thereby cause adhesion of slime (sludgy matter), there is the danger that the slime putrefies to thereby cause damages such as deterioration of the properties of the underwater structure and thus marked shortening of the life thereof.

For example, a composition comprising a copolymer of tributyltin methacrylate and methyl methacrylate and cuprous oxide ($Cu_2O$) has been used as an antifouling paint effectively applicable to ship bottoms for enabling the prevention of the above damages. This copolymer of the antifouling paint is hydrolyzed in the seawater to thereby liberate organotin compounds such as bistributyltin oxide (tributyltin ether of the formula $Bu_3Sn-O-SnBu_3$ wherein Bu is a butyl group) and tributyltin halides ($Bu_3SnX$ wherein X is a halogen atom), so that antifouling effect is exerted. Moreover, the copolymer hydrolyzate per se is a hydrolyzable self-polishing paint which is water-soluble and thus is dissolved in the seawater, so that no resin residue is left on the surface of the ship bottom coating to thereby enable continually maintaining active surface.

However, the above organotin compounds are so highly toxic that apprehensions are being entertained with respect to marine pollution, occurrence of anomalous fish and adverse effects on ecosystem through food chain. Therefore, the development of an antifouling paint not containing tin is desired as a substitute therefor.

For example, antifouling paints based on silyl esters as described in Japanese Patent Laid-open Publication Nos. 4(1992)-264170, 4(1992)-264169 and 4(1992)-264168 can be mentioned as the above antifouling paint not containing tin. However, these antifouling paints have problems that not only are their antifouling capabilities poor but also cracking and peeling are likely to occur as pointed out in Japanese Patent Laid-open Publication Nos. 6(1994)-157941 and 6(1994)-157940.

Further, Japanese Patent Laid-open Publication No. 2(1990)-196869 teaches an antifouling paint comprising a copolymer with blocked acid functionality (A) which is obtained by copolymerizing trimethylsilyl methacrylate, ethyl methacrylate and methoxyethyl acrylate in the presence of an azo initiator and which contains carboxyl groups blocked with trimethylsilyl groups and a polyvalent cation compound (B). Also, an antifouling paint comprising a chlorinated paraffin plasticizer in addition to the above acid-functional copolymer (A) and polyvalent cation compound (B) is disclosed in the Example portion of the publication. However, the coating film obtained from the antifouling paint disclosed in the above Example portion has a drawback in that the cracking resistance thereof is not fully satisfactory. That is, in Japanese Patent Laid-open Publication No. 2(1990)-196869, there is no description teaching what antifouling paint is excellent in cracking resistance and storage stability, especially, cracking resistance.

Published Japanese Translation of PCT Patent Applications from Other States, No. 60(1985)-500452 and Japanese Patent Laid-open Publication No. 63(1988)-215780 describe a resin for antifouling paint which is obtained by copolymerizing a vinyl monomer having an organosilyl group, such as a trialkylsilyl ester of (meth)acrylic acid, with another vinyl monomer and which has a number average molecular weight of 3000 to 40,000 and further describe that the resin can be blended with an organic water binder such as trimethyl orthoformate, an antifouling agent such as cuprous oxide and a pigment such as red iron oxide. However, as described in Japanese Patent Laid-open Publication No. 6(1994)-157940, this resin for antifouling paint has drawbacks in that it is likely to gel during the storage thereof and that the coating film formed from the antifouling paint is poor in cracking and peeling resistances.

Japanese Patent Publication No. 5(1993)-32433 corresponding to the above Published Japanese Translation of PCT Patent Applications from Other States, No. 60(1985)-500452 discloses an antifouling paint comprising a poison (a) and a polymer binder (b) having a repeating unit of the formula (—CH$_2$—CXCOOR)—(B)— wherein X is H or CH$_3$, R is SiR'$_3$ or Si(OR')$_3$ in which R' is an alkyl group, etc. and B is an ethylenically unsaturated monomer residue, which polymer binder has a specified hydrolysis rate, and describes that the paint can contain a solvent, a water-sensitive pigment component, an inert pigment, a filler and a retarder. However, the coating film obtained from the antifouling paint described in the publication has a drawback in that its cracking resistance is poor.

Japanese Patent Laid-open Publication No. 7(1995)-18216 discloses a coating composition comprising as principal components an organosilicon-containing polymer (A) having in its molecule a triorganosilicon ester group represented by the formula —COO—SiR$^1$R$^2$R$^3$ wherein each of R$^1$, R$^2$ and R$^3$ is, for example, an alkyl group having 1 to 18 carbon atoms and copper or a copper compound (B), which coating composition contains as an essential component other than the components A and B a silicon compound having an alkoxy group (C) represented by the formula:

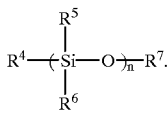

wherein each of R$^4$, R$^5$ and R$^6$ represents, for example, a hydrogen atom, an alkoxy group or a cycloalkoxy group having 1 to 18 carbon atoms; R$^7$ represents, for example, an alkyl group having 1 to 18 carbon atoms; and n is an integer of 1 to 3. In the columns describing constitution and function of invention of the publication, it is described that a plasticizer such as a chlorinated paraffin and a resin such as an acrylic resin may be incorporated in the coating composition according to necessity. However, the coating film obtained from the coating composition described in the publication has a drawback in that its cracking resistance is poor.

Japanese Patent Laid-open Publication No. 7(1995)-102193 discloses a coating composition comprising as essential components a copolymer obtained by polymerizing a monomer mixture containing monomer A represented by the formula:

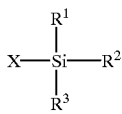

wherein each of R$^1$, R$^2$ and R$^3$ independently represents a group selected from among alkyl and aryl groups and X represents an acryloyloxy, a methacryloyloxy, a maleoyloxy or a fumaroyloxy group, and monomer B represented by the formula:

Y—(CH$_2$CH$_2$O)$_n$—R$^4$,

wherein R$^4$ represents an alkyl or an aryl group, Y represents an acryloyloxy or a methacryloyloxy group and n is an integer of 1 to 25.

Also, in the antifouling coating film for ships or underwater structures, there is a demand for the development of a self-polishing antifouling coating composition capable of forming a coating film being excellent in cracking and peeling resistances at a zone under alternate dry and wet, for example, a water line zone of ships brought in an environment in which immersion in the seawater and exposure to the air alternate with each other, which coating film can inhibit damages even where high pressure applies, for example, at block parts during ship building.

The present invention has been made with a view toward solving the above problems of the prior art, and an object of the present invention is to provide an antifouling coating composition which not only enables forming an antifouling coating film being excellent in cracking resistance, peeling resistances, antifouling properties and self-polishing (consumability) properties but also is excellent in storage stability.

Other objects of the present invention are to provide a coating film formed from this antifouling coating composition, an antifouling method using the antifouling coating composition and a hull or an underwater structure coated with the above coating film.

A further object of the present invention is to provide an antifouling coating composition capable of forming a coating film being excellent in properties such as cracking and peeling resistances not only in dry atmosphere, for example, above drafts of hulls and underwater structures but also in atmosphere in which immersion in the seawater and exposure to dryness alternate with each other because of draft changes, which coating film has such a high strength that, even if a pressure is applied to the coating film by blocks or the like, the damage by the pressure can be inhibited to a level of practically no significance.

DISCLOSURE OF THE INVENTION

The first antifouling coating composition of the present invention comprises an antifouling agent (biocide), a copolymer with film forming properties (film forming copolymer) of 1000 to 50,000 in number average molecular weight, this copolymer containing structural units derived from a trialkylsilyl ester of polymerizable unsaturated carboxylic acid in an amount of 20 to 65% by weight, and a chlorinated paraffin.

In the present invention, it is preferred that the chlorinated paraffin be contained in an amount of 18 to 65 parts by weight per 100 parts by weight of the film forming copolymer.

In this antifouling coating composition, it is preferred that the antifouling agent be at least one member selected from the group consisting of copper, copper compounds (e.g., cuprous oxide) and zinc pyrithione.

When the antifouling coating composition of the present invention comprises the film forming copolymer, the chlorinated paraffin and zinc pyrithione as the antifouling agent, it is preferred that the chlorinated paraffin and zinc pyrithione be contained in amounts of 10 to 65 parts by weight and 0.5 to 600 parts by weight, respectively, per 100 parts by weight of the film forming copolymer.

The first antifouling coating composition of the present invention may further comprise a (meth)acrylic ester polymer of 1000 to 100,000 in number average molecular weight that is compatible with the above film forming copolymer, a dehydrating agent (preferably, for example, inorganic dehydrating agent such as anhydrous gypsum and synthetic zeolite), a flake pigment (preferably, mica powder), zinc flower, etc.

In addition to the antifouling agent, the film forming copolymer and the chlorinated paraffin, when the first antifouling coating composition also contains the (meth)acrylic ester polymer, it is preferred that the (meth)acrylic ester polymer and the chlorinated paraffin be contained in the antifouling coating composition in amounts of 5 to 200 parts by weight and 5 to 150 parts by weight, respectively, per 100 parts by weight of the film forming copolymer.

Moreover, when the antifouling coating composition also contains a flake pigment (preferably, mica powder), it is preferred that the chlorinated paraffin and the flake pigment be contained in amounts of 5 to 65 parts by weight and 5 to 150 parts by weight, respectively, per 100 parts by weight of the film forming copolymer. The flake pigment preferably has an average particle size of 0.1 to 200 μm and an aspect ratio (ratio of long side to short side of particle) of at least 10.

When the first antifouling coating composition also contains the (meth)acrylic ester polymer and the flake pigment, it is preferred that the (meth)acrylic ester polymer, the chlorinated paraffin and the flake pigment be contained in amounts of 1 to 200 parts by weight, 3 to 200 parts by weight and 0.5 to 400 parts by weight, respectively, per 100 parts by weight of the film forming copolymer.

When the first antifouling coating composition also contains an inorganic dehydrating agent, it is preferred that the chlorinated paraffin and the inorganic dehydrating agent be contained in amounts of 10 to 65 parts by weight and 0.1 to 200 parts by weight, respectively, per 100 parts by weight of the film forming copolymer.

The second antifouling coating composition of the present invention comprises an antifouling agent, the above film forming copolymer and the above (meth)acrylic ester polymer, wherein the (meth)acrylic ester polymer is contained in an amount of 10 to 500 parts by weight per 100 parts by weight of the film forming copolymer.

As in the above first antifouling coating composition, this second antifouling coating composition of the present invention may further comprise a dehydrating agent (preferably, an inorganic dehydrating agent), the flake pigment, the chlorinated paraffin, zinc flower, etc.

In addition to the antifouling agent, the film forming copolymer and the (meth)acrylic ester polymer, when the second antifouling coating composition also contains a flake pigment, it is preferred that the (meth)acrylic ester polymer and the flake pigment be contained in amounts of 10 to 500 parts by weight and 0.5 to 400 parts by weight, respectively, per 100 parts by weight of the film forming copolymer.

When the second antifouling coating composition also contains the flake pigment and the inorganic dehydrating agent, it is preferred that the (meth)acrylic ester polymer, the flake pigment and the inorganic dehydrating agent be contained in amounts of 10 to 500 parts by weight, 0.5 to 400 parts by weight and 0.5 to 400 parts by weight, respectively, per 100 parts by weight of the film forming copolymer.

In the above first and second antifouling coating compositions, it is preferred that the antifouling agent be at least one member selected from the group consisting of copper, copper compounds and zinc pyrithione. Further, these antifouling coating compositions may further contain zinc flower (zinc oxide).

The third antifouling coating composition of the present invention comprises the above film forming copolymer and zinc flower, wherein the zinc flower is contained in an amount of 1 to 1000 parts by weight per 100 parts by weight of the film forming copolymer.

As in the above first and second antifouling coating compositions, this third antifouling coating composition of the present invention may further comprise the chlorinated paraffin, the (meth)acrylic ester polymer, the dehydrating agent, the antifouling agent (excluding zinc flower), etc.

In addition to the film forming copolymer and zinc flower, when the third antifouling coating composition also contains the chlorinated paraffin, it is preferred that the zinc flower and the chlorinated paraffin be contained in amounts of 1 to 1000 parts by weight and 18 to 65 parts by weight, respectively, per 100 parts by weight of the film forming copolymer.

When the third antifouling coating composition also contains the (meth)acrylic ester polymer, it is preferred that the zinc flower and the (meth)acrylic ester polymer be contained in amounts of 1 to 1000 parts by weight and 5 to 200 parts by weight, respectively, per 100 parts by weight of the film forming copolymer.

When the third antifouling coating composition also contains the (meth)acrylic ester polymer and the chlorinated paraffin, it is preferred that the zinc flower, the (meth)acrylic ester polymer and the chlorinated paraffin be contained in amounts of 1 to 1000 parts by weight, 5 to 200 parts by weight and 5 to 150 parts by weight, respectively, per 100 parts by weight of the film forming copolymer.

When the third antifouling coating composition contains the dehydrating agent, preferably, the inorganic dehydrating agent, it is preferred that the zinc flower and the dehydrating agent be contained in amounts of 1 to 1000 parts by weight and 0.1 to 200 parts by weight, respectively, per 100 parts by weight of the film forming copolymer.

In addition to the film forming copolymer and zinc flower, when the third antifouling coating composition of the invention also contains the chlorinated paraffin and the dehydrating agent, it is preferred that the zinc flower, the chlorinated paraffin and the dehydrating agent be contained in amounts of 1 to 1000 parts by weight, 3 to 200 parts by weight and 0.1 to 200 parts by weight, respectively, per 100 parts by weight of the film forming copolymer.

When the third antifouling coating composition also contains the chlorinated paraffin, the (meth)acrylic ester polymer and the dehydrating agent, it is preferred that the zinc flower, the chlorinated paraffin, the (meth)acrylic ester polymer and the dehydrating agent be contained in amounts of 1 to 1000 parts by weight, 3 to 200 parts by weight, 5 to 200 parts by weight and 0.1 to 200 parts by weight, respectively, per 100 parts by weight of the film forming copolymer.

In any of the above first, second and third antifouling coating compositions, it is preferred that the antifouling agent (excluding zinc flower) be contained in an amount of, for example, about 50 to 1500 parts by weight per 100 parts by weight of the film forming copolymer.

Further, in any of the above first, second and third antifouling coating compositions, it is preferred that at least one of the three alkyl groups bonded to silicon atom of the trialkylsilyl ester has at least 3 carbon atoms and, especially, that the trialkylsilyl ester be tributylsilyl (meth)acrylate. Moreover, it is preferred that the chlorinated paraffin have an average of 8 to 30 carbon atoms and a chlorine content of 35 to 75%.

The above (meth)acrylic ester polymer preferably comprises at least one member selected from the group consisting of hydrophobic (meth)acrylic ester homopolymers, copolymers of at least two (meth)acrylic esters and (meth)acrylic ester/styrene copolymers. The glass transition temperature (Tg) of these (meth)acrylic ester polymers is preferred to be not lower than 0° C. (on the average).

The antifouling coating film of the present invention is formed from the above antifouling coating composition.

In the antifouling method for hulls and underwater structures according to the present invention, the above antifouling coating composition is applied to surfaces of hulls and underwater structures to thereby form antifouling films.

The hull or underwater structure provided with antifouling coating according to the present invention has its surface coated with the coating film formed from the above antifouling coating composition.

The terminologies "cracking resistance" and "peeling resistance" used herein means those not only in water (including both seawater and fresh water) but also in air (dry) unless otherwise stated.

BEST MODE FOR CARRYING OUT THE INVENTION

The first, second and third antifouling coating compositions of the present invention will successively be described in greater detail below.

First Antifouling Coating Composition

The first antifouling coating composition of the present invention comprises an antifouling agent, the below defined copolymer with film forming properties (film forming copolymer) and a chlorinated paraffin.

In this antifouling coating composition, it is preferred that the chlorinated paraffin be contained in an amount of 18 to 65 parts by weight, preferably, 20 to 55 parts by weight per 100 parts by weight of the film forming copolymer.

Film Forming Copolymer

The film forming copolymer contained in this first antifouling coating composition contains structural units derived from a trialkylsilyl ester of polymerizable unsaturated carboxylic acid in an amount of 20 to 65% by weight, and the number average molecular weight of the film forming copolymer ranges from 1000 to 50,000.

This trialkylsilyl ester is represented by, for example, the following formula:

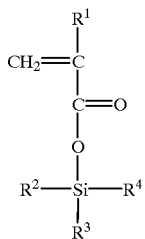

[I]

In the formula [I], $R^1$ represents a hydrogen atom or an alkyl group such as methyl, and each of $R^2$, $R^3$ and $R^4$ represents an alkyl group having about 1 to 18 carbon atoms such as methyl, ethyl, propyl or butyl. $R^2$, $R^3$ and $R^4$ are the same as or different from each other. Examples of suitable trialkylsilyl esters include trialkylsilyl esters in which all $R^2$, $R^3$ and $R^4$ groups are identical with each other, such as trimethylsilyl (meth)acrylate, triethylsilyl (meth)acrylate, tripropylsilyl (meth)acrylate, and tributylsilyl (meth) acrylate and further include trialkylsilyl esters in which the $R^2$, $R^3$ and $R^4$ groups partially or entirely different from each other, such as dimethylpropylsilyl (meth)acrylate, monomethyldipropylsilyl (meth)acrylate and methylethylpropylsilyl (meth)acrylate.

In the present invention, the above trialkylsilyl esters may be used singly or in combination. Among the above trialkylsilyl esters, those of which at least one of the $R^2$, $R^3$ and $R^4$ alkyl groups has at least 3 carbon atoms are preferred, and those of which all the $R^2$, $R^3$ and $R^4$ alkyl groups each have at least 4 carbon atoms are especially preferred. Further, it is particularly preferred to employ those of which the total of the carbon atoms of the $R^2$, $R^3$ and $R^4$ alkyl groups ranges from about 5 to 21. Among them, the use of tributylsilyl (meth)acrylate is most especially preferred from the viewpoint of the easiness of trialkylsilyl ester synthesis and the easiness of control of the film forming property, storage stability and grittability of the antifouling coating composition based on the trialkylsilyl ester.

Any arbitrary polymerizable unsaturated compound (ethylenically unsaturated monomer) can be used as a monomer (comonomer) employed in the copolymerization with the above trialkylsilyl ester. Examples of suitable polymerizable unsaturated compounds include alkyl (meth)acrylates such as methyl (meth)acrylate, ethyl (meth)acrylate, 2-ethylhexyl (meth)acrylate and cyclohexyl (meth)acrylate; styrenes such as styrene and α-methylstyrene; and vinyl esters such as vinyl acetate and vinyl propionate. The use of methyl methacrylate (MMA) is especially preferred. It is preferred that the MMA be contained in the comonomer (ethylenically unsaturated monomer) in an amount of at least 30% by weight, especially, at least 50% by weight. When the MMA is contained in the above amount, the glass transition temperature (Tg) of the copolymer is as high as, for example, 30 to 60° C., so that the strength of the coating film from the antifouling coating composition in which the chlorinated paraffin is incorporated as described later is not lowered.

In the copolymer, the structural units derived from the polymerizable unsaturated compound such as an alkyl (meth)acrylate and the structural units derived from the trialkylsilyl ester are generally bonded to each other at random as a result of the cleavage of each ethylene bond of the monomers as the respective starting compounds.

The presence of carboxylic acid residues in the above copolymer conspicuously deteriorates the storage stability of the obtained antifouling coating composition. Therefore, it is desired that no carboxylic acid residue be present in the copolymer. Thus, in the synthesis of the copolymer, it is preferred to employ a highly purified monomer which contains no carboxylic acid residue.

The film forming copolymer may comprise structural units derived from a single or a plurality of above trialkylsilyl esters of polymerizable unsaturated carboxylic acid (trialkylsilyl ester structural units) as mentioned above. It is preferred that the sum of the trialkylsilyl ester structural units contained in the copolymer range from 20 to 65% by weight, especially, from 30 to 55% by weight from the viewpoint that an antifouling coating film being excellent in long-term antifouling properties can be obtained from the concerned antifouling coating composition.

The number average molecular weight (Mn) measured by GPC of this copolymer ranges from 1000 to 50,000, preferably, from 2000 to 20,000, still preferably, from 2500 to 15,000 and, yet still preferably, from 3000 to 12,000. It is preferred that the weight average molecular weight (Mw) of the copolymer generally range from 1000 to 150,000 (150 thousand), especially, from 2000 to 60,000 (60 thousand) and, still especially, from 3000 to 30,000 (30 thousand) and that the molecular weight distribution (Mw/Mn) of the copolymer generally range from 1.0 to 4.0, especially, from 1.0 to 3.0 and, still especially, from 1.0 to 2.5. Further, it is preferred that the glass transition temperature (Tg °C) of the copolymer generally range from 15 to 80° C., especially, from 25 to 80° C., still especially, from 30 to 70° C. and, yet still especially, 35 to 60° C. and that the viscosity in, for example, 50% xylene solution of the copolymer generally range from 30 to 1000, especially, from 40 to 600 cps at 25° C.

When the number average molecular weight of this copolymer falls within the above range, there can be obtained an antifouling coating composition excellent in storage stability and an antifouling coating film being excellent in long-term antifouling properties, anti-damage properties (impact resistance) and cracking resistance.

Examples of suitable film forming copolymers (silyl ester copolymers) include the following numbered copolymers, of which copolymers 1 and 2 are preferred and copolymer 1 is especially preferred.

Copolymer 1: obtained by copolymerizing tributylsilyl methacrylate (a) with methyl methacrylate (MMA) in a weight ratio [(a)/(MMA)] of 35 to 65/65 to 35 (total of all components: 100 parts by weight) and having a number average molecular weight (Mn) of 1000 to 50 thousand, preferably, 3000 to 12,000; a weight average molecular weight (Mw) of 1000 to 150 thousand, preferably, 3000-to 30,000 (30 thousand); a molecular weight distribution (Mw/Mn) of 1.0 to 4.0, preferably, 1.0 to 2.5; a glass transition temperature (Tg °C.) of 30 to 70° C., preferably, 35 to 60° C.; and a viscosity in, for example, 50% xylene solution of 30 to 1000, preferably, 40 to 600 cps at 25° C.

Copolymer 2: obtained by copolymerizing tripropylsilyl methacrylate (b), methyl methacrylate (MMA) and 2-ethylhexyl acrylate (c) in a weight ratio [(b)/(MMA)/(c)] of 25 to 55/74 to 35/1 to 10 (total of all components: 100 parts by weight) and having a number average molecular weight (Mn) of 1000 to 50 thousand, preferably, 3000 to 12,000; a weight average molecular weight (Mw) of 1000 to 150 thousand, preferably, 3000 to 30,000 (30 thousand); a molecular weight distribution (Mw/Mn) of 1.0 to 4.0, preferably, 1.0 to 2.5; a glass transition temperature (Tg °C.) of 30 to 70° C., preferably, 35 to 60° C.; and a viscosity in, for example, 50% xylene solution of 30 to 1500, preferably, 40 to 1000 cps at 25° C.

Copolymer 3: obtained by copolymerizing tributylsilyl methacrylate (a), tripropylsilyl methacrylate (b) and methyl methacrylate (MMA) in a weight ratio [(a)/(b)/(MMA)] of 30 to 60/1 to 20/69 to 20 (total of all components: 100 parts by weight) and having a number average molecular weight (Mn) of 1000 to 50 thousand, preferably, 3000 to 12,000; a weight average molecular weight (Mw) of 1000 to 150 thousand, preferably, 3000 to 30,000 (30 thousand); a molecular weight distribution (Mw/Mn) of 1.0 to 4.0, preferably, 1.0 to 2.5; a glass transition temperature (Tg °C.) of 30 to 60° C., preferably, 35 to 55° C.; and a viscosity in, for example, 50% xylene solution of 30 to 1000, preferably, 40 to 400 cps at 25° C.

Copolymer 4: obtained by copolymerizing tributylsilyl methacrylate (a), tripropylsilyl methacrylate (b), methyl methacrylate (MMA) and 2-ethylhexyl acrylate (c) in a weight ratio [(a)/(b)/(MMA)/(c)] of 30 to 60/1 to 20/68 to 19/1 to 10 (total of all components: 100 parts by weight) and having a number average molecular weight (Mn) of 1000 to 50 thousand, preferably, 3000 to 12,000; a weight average molecular weight (Mw) of 1000 to 150 thousand, preferably, 3000 to 30,000 (30 thousand); a molecular weight distribution (Mw/Mn) of 1.0 to 4.0, preferably, 1.0 to 2.5; a glass transition temperature (Tg °C.) of 30 to 60° C., preferably, 35 to 55° C.; and a viscosity in, for example, 50% xylene solution of 30 to 1000, preferably, 40 to 400 cps at 25° C.

Copolymer 5: obtained by copolymerizing tributylsilyl methacrylate (a), methyl methacrylate (MMA) and 2-ethylhexyl acrylate (c) in a weight ratio [(a)/(MMA)/(c)] of 35 to 65/64.9 to 34.9/0.1 to 10 (total of all components: 100 parts by weight) and having a number average molecular weight (Mn) of 1000 to 50 thousand, preferably, 3000 to 12,000; a weight average molecular weight (Mw) of 1000 to 150 thousand, preferably, 3000 to 30,000 (30 thousand); a molecular weight distribution (Mw/Mn) of 1.0 to 4.0, preferably, 1.0 to 2.5; a glass transition temperature (Tg °C.) of 30 to 70° C., preferably, 35 to 60° C.; and a viscosity in, for example, 50% xylene solution of 30 to 1000, preferably, 40 to 600 cps at 25° C.

Copolymer 6: obtained by copolymerizing triisopropylsilyl acrylate (d), methyl methacrylate (MMA) and ethyl acrylate (e) in a weight ratio [(d)/MMAI(e)] of 40 to 65/59 to 20/1 to 20 (total of all components: 100 parts by weight) and having a number average molecular weight (Mn) of 1000 to 50 thousand, preferably 3000 to 12,000; a weight average molecular weight (Mw) of 1000 to 150 thousand, preferably 5 3000 to 30 thousand; a molecular weight distribution (Mw/Mn) of 1.0 to 4.0, preferably 1.0 to 3.0; a glass transition temperature (Tg °C.) of 20 to 80° C., preferably 25 to 75° C.; and a viscosity in, for example, 50 % xylene solution of 30 to 1500, preferably 40 to 13000 cps at 25° C.

Copolymer 7: obtained by copolymerizing triisobutylsilyl methacrylate (f), methyl methacrylate (MMA) and 2-ethylsilyl acrylate (g) in a weight ratio [(f)/(MMA)/(g)] of 35 to 65/64.9 to 34.9/0.1 to 10 (total of all components: 100 parts by weight) and having a number average molecular weight (Mn) of 1000 to 50 thousand, preferably 3000 to 12000; a weight average molecular weight of 1000 to 150 thousand, preferably 3000 to 30,000 (30 thousand); a molecular weight distribution (Mw/Mn) of 1.0 to 4.0, preferably 1.0 to 2.5; a glass transition temperature of 25 to 80° C., preferably 30 to 70° C.; and a viscosity in, for example, 50% xylene solution of 30 to 2000, preferably 40 to 1500 cps at 25° C.

The above film forming copolymer can be prepared by, for example, reacting a trialkylsilyl ester such as tributylsilyl methacrylate with a polymerizable unsaturated compound composed of comonomers containing methyl methacrylate in an amount of at least 50% by weight (e.g., 80% by weight) in the presence of an azo initiator such as 2,2'-azobisisobutyronitrile or a peroxide initiator and, if necessary, a polymerization modifier such as n-octylmercaptan in an organic solvent such as xylene, generally, in an inert atmosphere, such as a nitrogen gas stream, at about 50 to 120° C. for about 2 to 12 hr to thereby effect, for example, a radical polymerization.

The thus obtained film forming copolymer comprises structural units in proportions corresponding to the amounts of employed respective starting monomers.

The polymerization method is not limited to the above simple radical solution polymerization, and various customary methods can be employed. The solvent can arbitrarily be selected from among various solvents generally used for paint purposes, e.g., not only aromatic solvents (e.g., xylene) but also aliphatic, ketone, ester and ether solvents. Solvents whose water content is low are preferred because the use of such solvents can avoid hydrolysis reaction during the above reaction and thereafter. Alcoholic solvents have high initial water contents and are reactive with silanols, so that the use thereof during the above reaction is not suitable.

Chlorinated Paraffin

The chlorinated paraffin (chloroparaffin) contributes to improvement of the cracking resistance of the coating film (herein occasionally referred to as "antiifouling coating film") formed from the obtained antifouling coating composition. The chlorinated paraffin may be either linear or branched and may be either liquid or solid (powdery) at room temperature. However, suitably employed chlorinated paraffins each has an average of, generally, 8 to 30, preferably, 10 to 26 carbon atoms; a number average molecular weight of, generally, 200 to 1200, preferably, 300 to 1100; a viscosity of, generally, at least 1 ps, preferably, at least 1.2 ps at 25° C.; and a specific gravity of 1.05 to 1.80, preferably, 1.10 to 1.70 at 25° C. The use of the chlorinated paraffin of the above number of carbon atoms provides an antifouling coating composition capable of forming a coating film of reduced cracking and peeling. The number of carbon atoms of the chlorinated paraffin is preferably in the range of 8 to 30 from the viewpoint of the crack inhibiting effect, consumability (renewability) of the surface of the coating film and antifouling properties. It is preferred that the chlorination ratio (chlorine content: weight %) of the chlorinated paraffin generally range from 35 to 75%, especially, from 35 to 65%. The use of the chlorinated paraffin of the above chlorination ratio provides an antifouling coating composition capable of forming a coating film of reduced cracking and peeling. The chlorination ratio of the chlorinated paraffin is preferably in the range of 35 to 75% by weight from the viewpoint of miscibility (compatibility) with the film forming copolymer (silyl ester copolymer), crack inhibiting effect, consumability of the surface of the coating film and antifouling properties. Examples of suitable chlorinated paraffins include "TOYOPARAX 150" and "TOYOPARAX A-70" produced by Tosoh Corporation. In the present invention, a plurality of chlorinated paraffins whose chlorine contents and carbon quantities are different from each other can be used in combination. When a plurality of such chlorinated paraffins are used in combination, the above number of carbon atoms and chlorination ratio of the chlorinated paraffin means averages of the respective values of such chlorinated paraffins contained in the antifouling coating composition.

In the antifouling coating composition comprising the antifouling agent, the film forming copolymer and the chlorinated paraffin, it is preferred that the chlorinated paraffin be contained in an amount of 18 to 65 parts by weight, especially, 20 to 55 parts by weight and, still especially, 20 to 50 parts by weight per 100 parts by weight of the film forming copolymer. When the amount of the chlorinated paraffin is in the range of 18 to 65 parts by weight, there can be obtained an excellent crack inhibiting effect on the coating film formed from the concerned antifouling coating composition and an improvement in anti-damage properties (impact resistance).

When zinc pyrithione is used as the antifouling agent, in the antifouling coating composition comprising zinc pyrithione, the film forming copolymer and the chlorinated paraffin, it is preferred that the chlorinated paraffin be contained in an amount of 10 to 65 parts by weight, especially, 18 to 55 parts by weight, still especially, 20 to 50 parts by weight and, yet still especially, 20 to 40 parts by weight per 100 parts by weight of the film forming copolymer. When the amount of the chlorinated paraffin is in the range of 10 to 65 parts by weight, there can be obtained an excellent crack inhibiting effect on the coating film formed from the concerned antifouling coating composition and improvements in the strength of the coating film and anti-damage properties (impact resistance).

In the antifouling coating composition comprising not only the antifouling agent, the film forming copolymer and the chlorinated paraffin but also the below described dehydrating agent.(preferably, inorganic dehydrating agent), it is preferred that the chlorinated paraffin be contained in an amount of 10 to 65 parts by weight, especially, 18 to 55 parts by weight and, still especially, 20 to 50 parts by weight per 100 parts by weight of the film forming copolymer. When the amount of the chlorinated paraffin is in the range of 10 to 65 parts by weight, there can be obtained, as in the above case, an excellent crack inhibiting effect on the coating film formed from the concerned antifouling coating composition and improvements of the strength of the coating film and anti-damage properties (impact resistance).

Antifouling Agent

The antifouling agent may be either an organic one or an inorganic one and is not particularly limited. Examples of suitable antifouling agents include copper and copper compounds such as cuprous oxide ($Cu_2O$), copper powder and cuprous thiocyanate (copper rhodanide); metal pyrithiones represented by the formula:

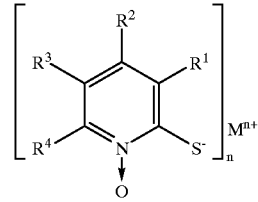

[II]

wherein each of $R_1$ to $R_4$ independently represents hydrogen, an alkyl, an alkoxy or a halogenated alkyl, M represents a metal such as Zn, Cu, Na, Mg, Ca, Ba, Pb, Fe or Al, and n is a valence, and derivatives thereof; tetramethylthiuram disulfide; carbamate poisons such as zinc dimethyldithiocarbamate and manganese 2-ethylenebisdithiocarbamate; 2,4,5,6-tetrachloroisophthalonitrile; N,N-dimethyldichlorophenylurea; 4,5-dichloro-2-n-octyl-4-isothiazoline-3-one; 2,4,6-trichlorophenylmaleimide; and pyridine triphenylborane-cupper rodanide. The use of cuprous oxide is especially preferred. It is preferred that each of antifouling agents other than cuprous oxide be used in combination with cuprous oxide. Zinc salt of 2-pyridinethiol-1-oxide (zinc pyrithione) can be mentioned as a preferred antifouling agent to be used in combination with cuprous oxide.

These antifouling agents can be used either individually or in combination.

This antifouling agent is varied in its content depending on the antifouling agent used in the preparation of the antifouling coating composition, the type of the film forming copolymer, the type of ship to which the antifouling coating composition is applied (ships for either overseas voyage or coastwise service, for various sea water areas, either wooden or steel made, etc.), etc. and which content cannot indiscriminately be determined, when the antifouling coating composition is composed of the antifouling agent, the film forming copolymer and the chlorinated paraffin, the antifouling agent is generally used in a total amount of 50 to 1500 parts by weight, preferably, 80 to 1200 parts by weight per 100 parts by weight of the film forming copolymer of the antifouling coating composition.

For example, when the above cuprous oxide is used as the antifouling agent, it may generally be contained in the antifouling coating composition in an amount of about 80 to 1200 parts by weight per 100 parts by weight of the film forming copolymer.

When the antifouling coating composition contains the above zinc pyrithione as the antifouling agent, a coating film having especially high slime resistance can be obtained. It is preferred that the zinc pyrithione be contained in the antifouling coating composition in an amount of, generally, 0.5 to 600 parts by weight, especially, 1.0 to 500 parts by weight per 100 parts by weight of the film forming copolymer. When the amount of zinc pyrithione is in the range of 0.5 to 600 parts by weight, there can be obtained an excellent slime resistance and an improvement in the cracking resistance.

It is preferred that the zinc pyrithione be contained in the antifouling coating composition in an amount of, generally, 0.1 to 30% by weight, especially, 0.5 to 20% by weight. The slime resistance of the antifouling coating composition containing zinc pyrithione highly depends on the zinc pyrithione content of the antifouling coating composition. When the content is in the range of 0.1 to 30% by weight, an antifouling coating composition being excellent in slime resistance can be obtained and the coating film (antifouling coating film) from the antifouling coating composition applied to ship bottoms is effectively prevented from crack occurrence upon being submerged.

The zinc pyrithione and antifouling agent other than zinc pyrithione to be contained in the antifouling coating composition of the present invention is varied in their contents depending on the antifouling agent used in the preparation of the antifouling coating composition, the type of the film forming copolymer, the type of ship to which the antifouling coating composition is applied (ships for either overseas voyage or coastwise service, for various sea water areas, either wooden or steel made, etc.), etc. and which contents cannot indiscriminately be determined. However, for the same reason, it is preferred that they be generally contained in a total amount of 50 to 1500 parts by weight, especially, 80 to 1200 parts by weight per 100 parts by weight of the film forming copolymer.

For example, when zinc pyrithione and cuprous oxide ($Cu_2O$) are used in combination as the antifouling agent, zinc pyrithione may be contained in the antifouling coating composition in the above amount and cuprous oxide generally in an amount of about 30 to 1200 parts by weight per 100 parts by weight of the film forming copolymer. Even if zinc pyrithione and cuprous oxide are contained, the antifouling coating composition of the present invention is excellent in storage stability and free from viscosity increase/gelation during the storage as different from the above-mentioned antifouling paint of the prior art.

In the conventional antifouling paint, the incorporation of zinc pyrithione causes viscosity increase/gelation. For example, as described in Japanese Patent Laid-open Publication No. 6(1994)-25560, a hydrolyzable self-polishing antifouling paint comprising a copolymer of tributyltin methacrylate, methyl methacrylate and butyl acrylate and, mixed therewith, zinc pyrithione and cuprous oxide has poor storage stability and suffers from gradual viscosity increase/gelation during the long-term storage. However, even if zinc pyrithione is contained or even if zinc pyrithione and cuprous oxide as another antifouling agent are contained, the antifouling coating composition of the present invention is excellent in storage stability and free from viscosity increase/gelation during the storage as described above.

Incidentally, the trend toward viscosity increase/gelation of the conventional antifouling paint containing zinc pyrithione during the storage can be made difficult to occur by the addition thereto of a divalent copper compound such as copper naphthenate or copper octylate, a metallic resin composition containing a divalent copper compound as described in Japanese Patent Laid-open Publication No. 62(1987)-57464 or the like because the zinc pyrithione of the antifouling paint is converted by chelate exchange to copper pyrithione although the slime resistance of the antifouling paint is occasionally deteriorated.

Other Component

The antifouling coating composition of the present invention comprises the antifouling agent, the film forming copolymer and the chlorinated paraffin. In addition, it may contain zinc flower (zinc oxide), a dehydrating agent, a (meth)acrylic ester polymer of 1000 to 100,000 in number average molecular weight that is compatible with the above film forming copolymer, a flake pigment, an antisagging/antisettling agent, a pigment, a solvent, etc.

Zinc Flower

The addition of zinc flower to the antifouling coating composition enables increasing the strength of the obtained coating film and also effectively controlling the grittability of the coating film. This zinc flower is preferably added in an amount of 5 to 400 parts by weight per 100 parts by weight of the film forming copolymer (polymer). Even if zinc flower and further the metal pyrithione of the above formula [II] or derivative thereof [(e].g., zinc pyrithione when $R^1$-$R^4$=H, M=Zn, n=2) are contained, the trend toward viscosity increase/gelation of the antifouling coating composition of the present invention attributed to the hydrolysis in the presence of water during the storage can be suppressed to thereby ensure excellent storage stability of the antifouling coating composition.

Dehydrating Agent

The addition of a dehydrating agent to the antifouling coating composition enables improving the storage stability thereof. Both an organic dehydrating agent and an inorganic dehydrating agent can be used. Examples of dehydrating agents include anhydrous gypsum ($CaSO_4$), synthetic zeolite adsorbents [trade name: Molecular Sieves 3A, 4A, 5A, 13X, etc., Molecular Sieves 3A, 4A and 5A are preferred, the numeral indicates the pore size (unit: angstrom)], orthoesters such as methyl orthoformate and methyl orthoacetate, orthoboric esters, silicates and isocyanates (trade name: Additive TI). Of these, inorganic dehydrating agents are preferred. In particular, anhydrous gypsum and Molecular Sieves, especially, Molecular Sieves are preferred.

At least one organic dehydrating agent and at least one inorganic dehydrating agent may be used in combination. Alternatively, either at least one organic dehydrating agent or at least one inorganic dehydrating agent, preferably, at least one inorganic dehydrating agent may be used. The reason for the preference for Molecular Sieves over anhydrous gypsum is as follows. When the antifouling coating composition containing anhydrous gypsum is applied to, for example, the surface of a ship bottom, water-soluble hydrated gypsum is likely to crystallize on the surface of the coating film in rainfall or sweat after application to thereby cause blushing of the coating film. Moreover, when a top coating is applied to the surface of the antifouling coating film, the top coating applicability is likely to suffer from (adverse) effects. For avoiding these, the use of Molecular Sieves is preferred.

The present invention will be described in greater detail in relation to the above dehydrating agent while comparing it with the coating composition of Japanese Patent Laid-open Publication No. 7(1995)-18216. A substance of relatively low molecular weight is contained as the film forming copolymer in the antifouling coating composition of the present invention, so that the viscosity increase/gelation during the storage is inhibited to some extent even in the antifouling coating composition not containing the dehydrating agent. Further, even if the viscosity of the antifouling coating composition is slightly increased and the trend thereof toward gelation is recognized during the long-term storage, the formed coating film is consumable (self-polishing) and excellent antifouling properties is recognized as long as the antifouling coating composition can be diluted with an appropriately selected solvent and applied to ship bottoms, etc. The reason for the retention of consumability despite the coating film formed from the antifouling coating composition having suffered from viscosity increase and gelation would be that, for example, in the antifouling coating composition containing the (meth)acrylic ester polymer, the film forming copolymer of relatively low molecular weight and the (meth)acrylic ester polymer are used in combination mainly in the above-mentioned proportions.

By contrast, the coating composition described in Japanese Patent Laid-open Publication No. 7(1995)-18216 exhibits a marked trend toward viscosity increase and gelation during the storage thereof when the dehydrating agent is not contained. The coating film formed by applying the coating composition having suffered from viscosity increase and gelation to, for example, ship bottoms has substantially no consumability recognized, thereby having poor antifouling properties.

In the present invention, it is preferred that, in particular, the inorganic dehydrating agent be contained in an amount of, generally, 0.1 to 200 parts by weight, especially, 0.5 to 100 parts by weight per 100 parts by weight of the film forming copolymer.

It is preferred that the inorganic dehydrating agent be contained in the antifouling coating composition in an amount of, generally, 0.01 to 10% by weight, especially, 0.1 to 5% by weight. When the amount of the inorganic dehydrating agent is in the range of 0.01 to 10% by weight, the effect of addition thereof is excellent and the antifouling properties can be improved.

When the inorganic dehydrating agent is used in combination with the organic dehydrating agent, the organic dehydrating agent may be added in an amount of, generally, about 5 to 300% by weight per 100 parts by weight of the inorganic dehydrating agent.

Antisagging/antisettling agent

Antisagging/antisettling agents other than those such as organic clay which deteriorate the storage stability of the antifouling coating composition can be added in arbitrary amounts. Examples of suitable antisagging/antisettling agents include salts such as Al, Ca and Zn stearates, lecithinates and alkylsulfonates, waxes such as polyethylene wax, amide wax, hydrogenated castor oil or polyamide wax and mixtures thereof, synthetic particulate silica and polyethylene oxide wax. Of these, hydrogenated castor oil wax, polyamide wax, synthetic particulate silica and polyethylene oxide wax are preferred. Further, use is made of antisagging/antisettling agents commercially available under the trade names, for example, "Disparon 305" and "Disparon 4200-20", products of Kusumoto Chemicals, Ltd.

(Meth)acrylic Ester Polymer

The antifouling coating composition of the present invention comprising the antifouling agent, the film forming copolymer and the chlorinated paraffin may further comprise a (meth)acrylic ester polymer (homopolymer or copolymer of a (meth)acrylic ester other than silyl (meth)acrylate) of 1000 to 100,000 (100 thousand) in number average molecular weight that is compatible with the above film forming copolymer.

The addition of the (meth)acrylic ester polymer compatible with the film forming copolymer to the antifouling coating composition of the present invention comprising the antifouling agent, the film forming copolymer and the chlorinated paraffin (together with the inorganic dehydrating agent, etc.) advantageously enables further improving the cracking resistance of the obtained coating film and regulating the rate of consumption of the coating film into the seawater and the retention of the antifouling capability within suitable ranges. Further, the above addition of the (meth)acrylic ester polymer advantageously enables exerting the effect of improving the adherence of the obtained coating film when the conventional antifouling coating film is coated with the antifouling coating composition of the present invention. Still further, the above addition of the (mpth) acrylic ester polymer advantageously enables improving the cracking resistance of the obtained coating film even if the amount of added chlorinated paraffin is reduced.

Homopolymers and copolymers of (meth)acrylic esters other than the silyl (meth)acrylate employed in the preparation of the film forming copolymer can be mentioned as the (meth)acrylic ester polymer compatible with the film forming copolymer. Examples thereof include (meth)acrylic ester homopolymers, copolymers or at least two (meth) acrylic esters and (meth)acrylic ester/styrene copolymers. These (meth)acrylic ester polymers can be used either individually or in combination.

The above (meth)acrylic ester polymer may be, for example, either linear or branched and further may have a crosslink structure as long as it is compatible with the film forming copolymer.

The terminology "(meth)acrylic ester polymer compatible with the film forming copolymer" used herein means the (meth)acrylic ester polymer whose 30% by weight xylene solution forms a transparent homogeneous solution or a milk-white homogeneous solution without separating to two liquid layers when mixed with a xylene solution containing the film forming copolymer (also referred to as "trialkylsilyl (meth)acrylate copolymer") in a concentration of 30% by weight in a volume ratio of 1:1 at 25° C.

When the number average molecular weight of the (meth) acrylic ester polymer falls within the above range, not only can inhibition of the cracking and regulation of the consumability be effectively carried out but also it is likely to enable forming an antifouling coating film which is also excellent in static antifouling properties.

When the number average molecular weight of the (meth) acrylic ester polymer is greater than the above range, it is likely for the static antifouling properties to be deteriorated although the effects of inhibiting the cracking of the obtained antifouling coating film and reducing the consumability thereof are conspicuous. On the other hand, when the number average molecular weight of the (meth)acrylic ester polymer is smaller than the above range, it is likely for the crack inhibiting effect to be deteriorated although the antifouling properties of the obtained antifouling coating film can be held high.

Examples of these (meth)acrylic ester polymers include homopolymers of a (meth)acrylic ester such as methyl (meth)acrylate, butyl (meth)acrylate, isobutyl (meth) acrylate, t-butyl (meth)acrylate, cyclohexyl (meth)acrylate or phenyl (meth)acrylate and copolymers of these monomers; and copolymers of the above (meth)acrylic ester monomer and each of various monomers such as styrenes and other aromatic vinyl compounds (e.g., styrene (ST)), vinyl acetate, vinyl chloride, ethylene, propylene, butadiene and vinyl ether compounds.

Specific examples of suitable (meth)acrylic ester polymers include:

Copolymer 1: obtained by copolymerizing methyl methacrylate (M) with butyl methacrylate (BMA) in a weight ratio [MMA/BMA] of 30 to 70/70 to 30 (total of all components: 100 parts by weight) and having a number average molecular weight of 1000 to 100 thousand, preferably, 1000 to 50 thousand;

Copolymer 2: obtained by copolymerizing isobutyl methacrylate (i-BMA), t-butyl methacrylate (t-BMA), styrene (ST) and stearyl methacrylate (SLMA) in a weight ratio [i-BMA/t-BMA/ST/SLMA] of 10 to 40/10 to 40/20 to 60/5 to 20 (total of all components: 100 parts by weight) and having a number average molecular weight of 1000 to 100 thousand, preferably, 1000 to 80 thousand or so;

Homopolymer 3: obtained by polymerizing methyl methacrylate (MMA) and having a number average molecular weight of 1000 to 100 thousand, preferably, 1000 to 20 thousand or so;

Homopolymer 4: obtained by polymerizing ethyl methacrylate (EMA) and having a number average molecular weight of 1000 to 100 thousand, preferably, 1000 to 20 thousand or so;

Copolymer 5: obtained by copolymerizing methyl methacrylate (MMA) with butyl acrylate (BA) in a weight ratio [MMA/BA] of 99 to 50/1 to 50 (total of all components: 100 parts by weight) and having a number average molecular weight of 1000 to 100 thousand, preferably, 1000 to 50 thousand or so; and Copolymer 6: obtained by copolymerizing ethyl methacrylate (EMA) with butyl acrylate (BA) in a weight ratio [EMA/BA] of 100 to 70/0 to 30 (total of all components: 100 parts by weight) and having a number average molecular weight of 1000 to 100 thousand, preferably, 1000 to 30 thousand or so.

Of the above (meth)acrylic ester polymers, it is preferred to employ hydrophobic acrylic polymers (having a (meth) acrylic ester content of greater than 50% by weight and a styrene content of less than 50% by weight) and styrene polymers (having a styrene content of at least 50% by weight). The use of copolymers 1 and 2 as the (meth)acrylic ester polymer is especially preferred.

It is preferred that the glass transition temperature (Tg) of the above (meth)acrylic ester polymer exceed 0° C. and especially preferred that it range from 20 to 105° C. The use of (meth)acrylic ester polymers of low glass transition temperature (Tg) (e.g., butyl acrylate (BA) homopolymer) occasionally deteriorates the effect of inhibiting cracking of the obtained antifouling coating film.

Although incorporated generally in an amount of 10 to 200 parts by weight per 100 parts by weight of the film forming copolymer in antifouling coating compositions containing the film forming copolymer but not containing the chlorinated paraffin, the above (meth)acrylic ester polymer can be used in the present antifouling coating composition containing the chlorinated paraffin in reduced amounts ranging from 5 to 200 parts by weight per 100 parts by weight of the film forming copolymer.

That is, in the antifouling coating composition comprising not only the antifouling agent, the film forming copolymer and the chlorinated paraffin but also the (meth)acrylic ester polymer, it is preferred that, per 100 parts by weight of the film forming copolymer, the antifouling agent be contained in an amount of, generally, 100 to 2000 parts by weight, especially, 150 to 1500 parts by weight, the (meth)acrylic ester polymer be contained in an amount of 5 to 200 parts by weight, especially, 10 to 200 parts by weight and, still especially, 15 to 160 parts by weight, and the chlorinated paraffin be contained in an amount of, generally, 5 to 150 parts by weight, especially, 8 to 100 parts by weight.

In particular, when the antifouling agent contains zinc pyrithione, it is preferred that, in the antifouling coating composition, zinc pyrithione be contained in an amount of, generally, 0.5 to 600 parts by weight, especially, 1 to 500 parts by weight and, still especially, 2 to 400 parts by weight per 100 parts by weight of the film forming copolymer and that the antifouling agent as a whole containing zinc pyrithione be contained in an amount of, generally, 50 to 1500 parts by weight, especially, 80 to 1200 parts by weight per 100 parts by weight of the film forming copolymer, together with the above amounts of the (meth)acrylic ester polymer and chlorinated paraffin.

Further, in the antifouling coating composition comprising the antifouling agent, the film forming copolymer, the chlorinated paraffin, the inorganic dehydrating agent and the (meth)acrylic ester polymer, it is preferred that, per 100 parts by weight of the film forming copolymer, the antifouling agent be contained in an amount of, generally, 50 to 1500 parts by weight, especially, 80 to 1200 parts by weight, the inorganic dehydrating agent be contained in an amount of 0.1 to 200 parts by weight, especially, 0.5 to 100 parts by weight and, still especially, 1 to 100 parts by weight, and the (meth)acrylic ester polymer and the chlorinated paraffin be contained in the above amounts.

In both the above compositions, when the content of the chlorinated paraffin is in the range of 5 to 150 parts by weight, the cracking of the obtained antifouling coating film is satisfactorily inhibited and the mechanical strength of the obtained antifouling coating film become excellent.

It is desired that no carboxyl residue be present in the (meth)acrylic ester polymer of the antifouling coating composition as in the above film forming copolymer. When the carboxyl residue is present in the (meth)acrylic ester polymer, the storage stability of the obtained antifouling coating composition is likely to be gravely deteriorated. Therefore, it is preferred that the monomer having no carboxyl residue be employed so that the acid value (AV) of the polymer is as low as, generally, up to 15, preferably, up to 10 and, still preferably, up to 5.

The above antifouling coating composition containing the (meth)acrylic ester polymer enables inhibiting cracking of the antifouling coating film and regulating the consumption thereof, for example, even when the antifouling coating composition is applied to ship bottoms and the formed coating film (antifouling coating film) is submerged. The above antifouling coating composition can provide required consumption degree and antifouling performance in accordance with the environment in which the formed coating film is placed. Therefore, the antifouling coating composition containing the (meth)acrylic ester polymer enables minimizing the thickness of the coating film according to use, so that, also, economic advantage is great.

Flake Pigment

The antifouling coating composition of the present invention comprising the antifouling agent, the film forming copolymer and the chlorinated paraffin may further contain the following flake pigment.

Examples of suitable flake pigments include mica powder, flake aluminum powder, copper powder, zinc powder and pearlescent pigment. Of these, mica powder is preferred.

Ores from which mica powder can be obtained, for example, include:

muscovite ores such as muscovite, lepidolite, paragonite, sericite, roscoelite and illite, biotite ores such as biotite, phlogopite, lepidomelane and zinnwaldite, and glauconite and celadonite. Generally, muscovite pulverization product is employed.

Although, generally, the average particle size and aspect ratio of the above flake pigment are not particularly limited, it is preferred that the average particle size range from 0.1 to 200 μm and the aspect ratio (ratio of long side to short side of particle) be at least 10.

In the antifouling coating composition comprising not only the antifouling agent, the film forming copolymer and the chlorinated paraffin but also the flake pigment, it is preferred that, per 100 parts by weight of the film forming copolymer, the antifouling agent be contained in an amount of, generally, 100 to 800 parts by weight, especially, 200 to 600 parts by weight, the chlorinated paraffin be contained in an amount of, generally, 5 to 65 parts by weight, especially, 8 to 55 parts by weight, and the flake pigment be contained in an amount of, generally, 1 to 150 parts by weight, especially, 5 to 150 parts by weight, still especially, 5 to 100 parts by weight and, yet still especially, 5 to 90 parts by weight.

In particular, when the antifouling agent contains zinc pyrithione, it is preferred that, in the antifouling coating composition, zinc pyrithione be contained in an amount of, generally, 0.5 to 600 parts by weight, especially, 1 to 500 parts by weight per 100 parts by weight of the film forming copolymer and that the antifouling agent as a whole containing zinc pyrithione be contained in an amount of, generally, 50 to 1500 parts by weight, especially, 80 to 1200 parts by weight per 100 parts by weight of the film forming copolymer, together with the above amounts of the chlorinated paraffin and flake pigment.

Further, in the antifouling coating composition comprising the antifouling agent, the film forming copolymer, the chlorinated paraffin and the inorganic dehydrating agent and further the flake pigment, it is preferred that, per 100 parts by weight of the film forming copolymer, the antifouling agent be contained in an amount of, generally, 50 to 1500 parts by weight, especially, 80 to 1200 parts by weight, the chlorinated paraffin be contained in an amount of, generally, 5 to 65 parts by weight, especially, 8 to 55 parts by weight, the inorganic dehydrating agent be contained in an amount of 0.1 to 200 parts by weight, especially, 1 to 100 parts by weight, and the flake pigment be contained in an amount of, generally, 1 to 100 parts by weight, especially, 5 to 90 parts by weight.

In both the above antifouling coating compositions, when the amount of the flake pigment is in the range of 1 to 100 parts by weight, the effect of the addition thereof is satisfactory and the antifouling effect becomes excellent.

This antifouling coating composition containing the flake pigment not only exerts the above effects but also enables forming a coating film having especially high cracking resistance.

It is generally considered that the blending of the flake pigment in an antifouling coating composition would be effective in improving the cracking resistance of the obtained coating film. However, the conventional antifouling paint had the problem that the blending of a flake pigment having no physiological activity therein blocks the elution of the antifouling agent from the obtained antifouling coating film to thereby gravely deteriorate the antifouling activity thereof. By contrast, the coating film formed from the silylester-based antifouling coating composition (AF) of the present invention being excellent in self-polishing properties (consumability) is excellent in surface renewability in seawater, so that, even if the flake pigment is present on the surface of the coating film, satisfactory renewal of the coating film is attained. Moreover, the antifouling activity is originally on an extremely high level, so that it is feasible to more effectively inhibit cracking after submergence while restricting excess elution of the antifouling agent and retaining (regulating) it within an appropriate range.

More concrete description will be made with respect to an example of coating film which has been formed from the antifouling coating composition containing a copolymer of tributylsilyl (meth)acrylate [TBS(M)A] and methyl (meth) acrylate [M(M)A] as the film forming copolymer. In the seawater, the tributylsiloxy group ($Bu_3SiO$—) of the film forming copolymer is cleaved from the carbonyl group (—CO—) bonded to the principal chain of the copolymer under the influence of hydroxide ion ($OH^-$), etc. and converted to tributylsilanol ($Bu_3SiOH$), thereby being dissolved into the seawater. Further, the polymer constituting the principal chain is also detached and dissolved into the seawater in a structure of carboxylic salt (—$COO^-$). Therefore, the antifouling coating film interface with the seawater (surface of the antifouling coating film) would be continuously renewed. Accordingly, the antifouling agent contained in the antifouling coating film is rapidly liberated from the surface of the antifouling coating film. However, when the flake pigment is contained in the coating composition as mentioned above, the contact of the antifouling agent and film forming copolymer with the seawater is restricted, so that the above effect would be exerted in the present invention.

The antifouling coating composition of the invention comprising the antifouling agent, the film forming copolymer and the chlorinated paraffin may contain the (meth) acrylic ester polymer and the flake pigment.

In the antifouling coating composition comprising the antifouling agent, the film forming copolymer, the chlorinated paraffin, the (meth)acrylic ester polymer and the flake pigment, it is preferred that, per 100 parts by weight of the film forming copolymer, the antifouling agent be contained in an amount of, generally, 100 to 2000 parts by weight, especially, 150 to 1500 parts by weight, the chlorinated paraffin be contained in an amount of, generally, 3 to 200 parts by weight, especially, 5 to 100 parts by weight and, still especially, 10 to 100 parts by weight, the (meth)acrylic ester polymer be contained in an amount of, generally, 1 to 200 parts by weight, especially, 5 to 100 parts by weight and, still especially, 10 to 100 parts by weight, and the flake pigment be contained in an amount of, generally, 0.5 to 400 parts by weight, especially, 1 to 200 parts by weight and, still especially, 5 to 150 parts by weight.

In particular, when the antifouling agent contains zinc pyrithione, it is preferred that, in the antifouling coating composition, zinc pyrithione be contained in an amount of, generally, 0.5 to 600 parts by weight, especially, 1 to 500 parts by weight and, still especially, 2 to 400 parts by weight per 190 parts by weight of the film forming copolymer and that the antifouling agent as a whole containing zinc pyrithione be contained in an amount of, generally, 50 to 1500 parts by weight, especially, 80 to 1200 parts by weight per 100 parts by weight of the film forming copolymer, together with the above amounts of the chlorinated paraffin, (meth)acrylic ester polymer and flake pigment.

Further, in the antifouling coating composition comprising not only the antifouling agent, the film forming copolymer, the chlorinated paraffin and the inorganic dehydrating agent but also the (meth)acrylic ester polymer and the flake pigment, it is preferred that, per 100 parts by weight of the film forming copolymer, the antifouling agent be contained in an amount of, generally, 50 to 1500 parts by weight, especially, 80 to 1200 parts by weight, the inorganic dehydrating agent be contained in an amount of, generally, 0.1 to 200 parts by weight, especially, 1 to 100 parts by weight and, still especially, 5 to 90 parts by weight, and the chlorinated paraffin, the (meth)acrylic ester polymer and the flake pigment be contained in the same amounts as above.

Pigment, Solvent, etc.

Not only the below described flake pigment (e.g., mica powder) but also various conventional organic and inorganic pigments (e.g., titanium white and red iron oxide) can be used as the pigment. In addition, various colorants such as dyes may be incorporated in the antifouling coating composition.

Various solvents customarily used in antifouling paints such as aliphatic, aromatic (e.g., xylene and toluene), ketone, ester and ether solvents can be incorporated in the antifouling coating composition.

The present antifouling coating composition is of the one package type and has excellent storage stability. Further, when the antifouling coating composition is applied to, for example, a ship bottom and formed coating film (antifouling coating film) is submerged, cracking of the antifouling coating film is inhibited. Still further, when the antifouling coating composition is applied to a primer surface, peeling of the antifouling coating film from the primer surface is inhibited. Still further, when coating of, for example, a ship bottom with each of various antifouling paints including the antifouling coating composition of the present invention is conducted a plurality of times or when the antifouling coating composition of the present invention is applied for repair to the surface of, for example, a ship bottom already covered with the antifouling coating film of the present invention, peeling of the antifouling coating film of the present invention from the surface of the previously formed antifouling coating film is inhibited. Moreover, consumption regulation can be executed with respect to the above antifouling coating film of the present invention provided on the primer surface, the surface of ship bottom to be repaired, etc., so that required consumption degree and antifouling power (properties) can be given in accordance with the environment in which the antifouling coating film is used. Accordingly, the present antifouling coating composition enables minimizing the thickness of the antifouling coating film to be formed in accordance with use, so that economic advantage is great.

The first antifouling coating composition of the present invention is as fully described above. The respective constitutions, contents and preferred forms of the antifouling agent, film forming copolymer, (meth)acrylic ester polymer, chlorinated paraffin, flake pigment and other components contained in the above antifouling coating composition apply as they are to the following second and third antifouling coating compositions of the present invention unless otherwise specified.

The second antifouling coating composition of the present invention will be described in detail below.

Second Antifouling Coating Composition

The second antifouling coating composition of the present invention (second antifouling coating composition) comprises the antifouling agent, the film forming copolymer and the (meth)acrylic ester polymer, in which the (meth)acrylic ester polymer is contained in an amount of 10 to 500 parts by weight, preferably, 15 to 400 parts by weight and, still preferably, 20 to 300 parts by weight per 100 parts by weight of the film forming copolymer.

This antifouling coating composition is of the one package type and has excellent storage stability. The antifouling coating film formed by applying the antifouling coating composition to the surface of a ship bottom or the like and curing it is resistant to cracking when submerged and has excellent antifouling and self-polishing properties (consumability). Further, when the coating film is provided on the surface of a primer, peeling of the antifouling coating film from the primer surface is inhibited. Still further, the consumption rate and antifouling performance of the coating film can be regulated, so that the thickness of the antifouling coating film can be minimized in accordance with the use of the antifouling coating composition to thereby ensure economic advantage.

The above second antifouling coating composition comprising the antifouling agent, the film forming copolymer and the (meth)acrylic ester polymer may contain the flake pigment, the dehydrating agent, zinc flower, the antisagging/antisettling agent, the pigment, the solvent, etc.

In the second antifouling coating composition comprising not only the antifouling agent, the film forming copolymer and the (meth)acrylic ester polymer but also the flake pigment, preferably, mica powder, it is preferred that, per 100 parts by weight of the film forming copolymer, the antifouling agent be contained in an amount of, generally, 50 to 1500 parts by weight, especially, 80 to 1200 parts by weight, the (meth)acrylic ester polymer be contained in an amount of, generally, 10 to 500 parts by weight, especially, 10 to 300 parts by weight and, still especially, 10 to 200 parts by weight, and the flake pigment be contained in an amount of, generally, 0.5 to 400 parts by weight, especially, 1 to 200 parts by weight and, still especially, 5 to 150 parts by weight.

The above antifouling coating composition containing the flake pigment not only exerts the above effects but also enables forming an antifouling coating film having especially high cracking resistance. When the amount of the flake pigment is in the range of 0.5 to 400 parts by weight, the effect of the addition thereof is satisfactory and the antifouling effect becomes excellent.

The second antifouling coating composition may contain the above dehydrating agent, preferably, the inorganic dehydrating agent (e.g., Molecular Sieve, anhydrous gypsum, etc.). In this antifouling coating composition, it is preferred that the inorganic dehydrating agent be contained in an amount of 0.5 to 400 parts by weight, especially, 1 to 200 parts by weight per 100 parts by weight of the film forming copolymer.

The second antifouling coating composition may contain not only arbitrary components such as the antisagging/antisettling agent, the pigment and the solvent but also various components customarily added to antifouling paints, such as a plasticizer, an elution auxiliary, a dissolution retarder, an antiflooding agent and a defoamer.

Examples of these customary components include:

elution auxiliaries such as rosin, naphthenic acid, metal salts of rosin and metal salts of naphthenic acid;

plasticizers such as chlorinated paraffin (chloroparaffin), dioctyl phthalate (DOP) and tricresyl phosphate (TCP);

resins such as chlorinated rubber, vinyl chloride resin, vinyl ether resin and styrene/butadiene resin; and particulate silica.

For example, chlorinated paraffin added according to necessity may be contained in the antifouling coating composition of the present invention in an amount of 1 to 200 parts by weight, preferably, 5 to 100 parts by weight and, still preferably, 10 to 100 parts by weight per 100 parts by weight of the film forming copolymer.

When the amount of the chlorinated paraffin is in the range of 1 to 200 parts by weight, the crack inhibiting effect is fully exerted on the coating film formed from the antifouling coating composition and the strength of the coating film and the resistant to damages (impact) becomes excellent.

The above one-package second antifouling coating composition of the present invention enables forming an antifouling coating film which is excellent not only in cracking resistance, properties such as resistance to peeling from ship bottoms and other substrates or primer layers and antifouling properties but also in storage stability and consumability (self-polishing properties).

The third antifouling coating composition of the present invention will be described in detail below.

Third Antifouling Coating Composition

The third antifouling coating composition of the present invention (third antifouling coating composition) comprises the above film forming copolymer and zinc flower (zinc oxide), in which the zinc flower is contained in an amount of 1 to 1000 parts by weight, preferably, 3 to 500 parts by weight per 100 parts by weight of the film forming copolymer. When the amount of zinc flower is in the range of 1 to 1000 parts by weight, cracking and peeling readily do not occur on the coating film brought under dry conditions, for example, exposed to air. Moreover, not only can excellent improvement obtained in the effect on cracking and peeling resistances (including cracking and peeling resistances in submergence and under alternate dry and wet as in the vicinity of draft) but also cracking at the time of application or drying due to the excessively high pigment content and increase of the quantity of dust at the time of spray coating can be prevented.

This antifouling coating composition comprising the film forming copolymer and zinc flower (zinc oxide) may contain the chlorinated paraffin, the (meth)acrylic ester polymer, the dehydrating agent, the antifouling agent (excluding zinc flower) and the flake pigment as in the above first and second antifouling coating compositions.

In the third antifouling coating composition the chlorinated paraffin, it is preferred that zinc flower be contained in the above amount and that the chlorinated paraffin be contained in an amount of, generally, 18 to 65 parts by weight, especially, 20 to 55 parts by weight and, still especially, 20 to 50 parts by weight per 100 parts by weight of the film forming copolymer. When the amount of the chlorinated paraffin is in the range of 18 to 65 parts by weight, the crack inhibiting effect on the coating film formed from the antifouling coating composition and the strength of the coating film are excellent and the resistant to damages also becomes excellent.

In the third antifouling coating composition containing the (meth)acrylic ester polymer, it is preferred that zinc flower be contained in the above amount and that the (meth)acrylic ester polymer be contained in an amount of 5 to 200 parts by weight, especially, 10 to 200 parts by weight per 100 parts by weight of the film forming copolymer.

The addition of the (meth)acrylic ester polymer to the third antifouling coating composition in the above amount advantageously enables further improving the cracking resistance of the obtained coating film and regulating the rate of consumption of the coating film into the seawater and the retention of the antifouling capability within suitable ranges. Further, the above addition of the (meth)acrylic ester polymer advantageously enables exerting the effect of further improving the adherence of the obtained coating film when the conventional antifouling coating film is coated with the antifouling coating composition of the present invention. Still further, the above addition of the (meth)acrylic ester polymer advantageously enables improving the cracking resistance of the obtained coating film even if the amount of added chlorinated paraffin is reduced. The content of the (meth)acrylic ester polymer can be decreased in the antifouling coating composition containing the chlorinated paraffin. In this composition, the (meth)acrylic ester polymer can be used in an amount of 5 to 200 parts by weight per 100 parts by weight of the film forming copolymer.

In the third antifouling coating composition containing the chlorinated paraffin and the (meth)acrylic ester polymer, it is preferred that, per 100 parts by weight of the film forming copolymer, zinc flower be contained in the above amount, the (meth)acrylic ester polymer be contained in an amount of 5 to 200 parts by weight, especially, 10 to 200 parts by weight and, still especially, 15 to 160 parts by weight, and the chlorinated paraffin be contained in an amount of 5 to 150 parts by weight, especially, 8 to 100 parts by weight. Further, in this antifouling coating composition, it is preferred that the antifouling agent be contained in an amount of, generally, 100 to 2000 parts by weight, especially, 150 to 1500 parts by weight per 100 parts by weight of the film forming copolymer. When the amount of the chlorinated paraffin is in the range of 5 to 150% parts by weight, resistance to cracking on the obtained antifouling coating film and the mechanical strength of the obtained antifouling coating film both become excellent.

In the third antifouling coating composition containing the dehydrating agent, it is preferred that zinc flower be contained in the above amount and that the dehydrating agent be contained in an amount of 0.1 to 200 parts by weight, especially, 0.1 to 100 parts by weight per 100 parts by weight of the film forming copolymer.

In the third antifouling coating composition containing the chlorinated paraffin and the dehydrating agent, it is preferred that, per 100 parts by weight of the film forming copolymer, zinc flower be contained in the above amount, the chlorinated paraffin be contained in an amount of 3 to 200 parts by weight, especially, 5 to 150 parts by weight and, still especially, 18 to 65 parts by weight, and the dehydrating agent be contained in an amount of 0.1 to 200 parts by weight, especially, 1 to 100 parts by weight.

In the third antifouling coating composition containing the chlorinated paraffin, the (meth)acrylic ester polymer and the dehydrating agent, it is preferred that, per 100 parts by weight of the film forming copolymer, the zinc flower and the dehydrating agent be contained in the above amounts, the chlorinated paraffin be contained in an amount of 3 to 200 parts by weight, especially, 5 to 150 parts by weight, and the (meth)acrylic ester polymer be contained in an amount of 1 to 200 parts by weight, especially, 5 to 200 parts by weight and, still especially, 10 to 200 parts by weight.

The addition of the flake pigment to the antifouling coating composition enables more effectively inhibiting the cracking after submergence while regulating an excess elution of the antifouling agent from the antifouling coating film so as to hold the elution within an appropriate range.

In the third antifouling coating composition comprising not only the film forming copolymer and zinc flower but also the chlorinated paraffin and the flake pigment, it is preferred that, per 100 parts by weight of the film forming copolymer, zinc flower be contained in the above amount, the chlorinated paraffin be contained in an amount of, generally, 5 to 65 parts by weight, especially, 8 to 55 parts by weight, and the flake pigment be contained in an amount of, generally, 1 to 100 parts by weight, especially, 5 to 90 parts by weight.

Further, in this antifouling coating composition, it is preferred that the antifouling agent be contained in an amount of, generally, 100 to 800 parts by weight, especially, 200 to 600 parts by weight per 100 parts by weight of the film forming copolymer. When the amount of the flake pigment is in the range of 1 to 100 parts by weight, the effect of the addition thereof is satisfactory and the antifouling effect becomes excellent. The above antifouling coating composition containing the flake pigment not only exerts the above effects but also enables forming an antifouling coating film having especially high cracking resistance.

In the third antifouling coating composition of the present invention containing the chlorinated paraffin, the (meth) acrylic ester polymer and the flake pigment, it is preferred that, per 100 parts by weight of the film forming copolymer, the zinc flower be contained in the above amount, the chlorinated paraffin be contained in an amount of, generally, 3 to 200 parts by weight, especially, 5 to 100 parts by weight and, still especially, 10 to 100 parts by weight, the (meth)acrylic ester polymer be contained in an amount of, generally, 1 to 200 parts by weight, especially, 5 to 100 parts by weight and, still especially, 10 to 100 parts by weight, and the flake pigment be contained in an amount of, generally, 0.5 to 400 parts by weight, especially, 1 to 200 parts by weight and, still especially, 5 to 150 parts by weight. In this antifouling coating composition, it is preferred that the antifouling agent be contained in an amount of, generally, 100 to 2000 parts by weight, especially, 150 to 1500 parts by weight per 100 parts by weight of the film forming copolymer.

The addition of the dehydrating agent to the third antifouling coating composition of the present invention enables further improving the storage stability of the composition. It is preferred that the dehydrating agent be contained in an amount of, generally, 0.1 to 200 parts by weight, especially, 1 to 100 parts by weight per 100 parts by weight of the film forming copolymer.

With respect to all the above third antifouling coating compositions, further addition of the antifouling agent (excluding zinc flower) thereto is preferred. Unless otherwise specified, it is preferred that the antifouling agent (excluding zinc flower) be contained in an amount of, for example, 50 to 1500 parts by weight, especially, 80 to 1200 parts by weight or so per 100 parts by weight of the film forming copolymer. Copper, copper compounds (e.g., cuprous oxide), zinc pyrithione and the like are suitably used as the antifouling agent (biocide) as in the above first and second antifouling coating compositions.

This third antifouling coating composition enables forming a high-performance coating film which is excellent in cracking and peeling resistances, especially, in dryness, for example, exposure to air and which is free from rapid advance of cracking and peeling (stable irrespective of passage of time) even in atmosphere in which immersion in the water and exposure to dryness alternate with each other because of draft changes.

This third antifouling coating composition, when comprising not only the film forming copolymer and zinc flower but also the chlorinated paraffin, (meth)acrylic ester polymer, dehydrating agent, antifouling agent (excluding zinc flower), etc., enables forming an antifouling coating film which not only exerts the above effects but also is excellent in properties such as resistance to peeling from ship bottoms and other substrates or primer layers and further in antifouling and self-polishing (consumability) properties. Moreover, the storage stability of the composition is excellent.

Process for Production

All the first, second and third antifouling coating compositions of the present invention described in detail above can be produced by appropriate employment of conventional techniques. The production can be achieved by combining the above-mentioned components together in the above-mentioned proportions simultaneously or in arbitrary sequential order and subjecting the resultant matter to agitation/mixing/dispersion. For example, the above antifouling agent, zinc flower, film forming copolymer, chlorinated paraffin, (meth)acrylic ester polymer, flake pigment, dehydrating agent, antisagging/antisettling agent, pigment and solvent are combined simultaneously or in arbitrary sequential order and subjected to agitation/mixing/dispersion.

EFFECT OF THE INVENTION

The first and second antifouling coating compositions of the present invention enables forming an antifouling coating film which is excellent in properties such as cracking and peeling resistances, in antifouling properties and in self-polishing (consumability) properties. Moreover, the antifouling coating compositions are free from viscosity increase/gelation during the storage and has excellent storage stability.

The third antifouling coating composition of the present invention enables forming a coating film being excellent in properties such as cracking and peeling resistances, i.e., not only exhibiting excellent cracking and peeling resistances in dry atmosphere, for example, above drafts of hulls and underwater structures but also being free from rapid advance of cracking and peeling in atmosphere in which immersion in the seawater and exposure to dryness alternate with each other because of draft changes, which coating film has such a high strength that, even if a pressure is applied to the coating film by blocks or the like, the damage by the pressure can be inhibited to a level of practically no significance.

EXAMPLE

The present invention will further be illustrated below with reference to the following Examples which in no way limit the scope of the invention. In the following Examples and Comparative Examples, the term "parts" means "parts by weight". In the Tables, the amount of each component, e.g., the copolymer, chlorinated paraffin (chloroparaffin), coloring pigment, cuprous oxide, zinc flower or solvent (e.g., xylene) is expressed by "parts by weight" unless otherwise specified.

Example of Polymer Production

Production of copolymer S-1

100 parts by weight of xylene was charged in a reaction vessel equipped with an agitator, a condenser, a thermometer, a dropping device and a heating/cooling jacket and heated under agitation at 90° C. under a nitrogen gas stream.

A mixture of 40 parts by weight of tributylsilyl methacrylate, 60 parts by weight of methyl methacrylate and 1.2 parts by weight of 2,2'-azobisisobutyronitrile as an initiator was dropped through the dropping device into the reaction vessel while maintaining the above temperature over a period of 4 hr.

The agitation was continued at the same temperature for 4 hr. thereby obtaining colorless transparent copolymer solution S-1.

The nonvolatile content of the obtained copolymer solution S-1 was 49.9% by weight after heating at 105° C. for 3 hr. Quantitative analysis of residual monomers by GPC showed that at least 95% of each monomer was incorporated in the copolymer, that the respective polymerization rate changes during reaction of the monomers were substantially equal to each other, and that the respective structural units derived from the monomers would be randomly arranged substantially in accordance with the quantitative proportions of charged monomers.

The copolymer (nonvolatile content) S-1 dissolved in the copolymer solution S-1 whose viscosity was 295 cps at 25° C. had a glass transition temperature (Tg) of 51° C., a number average molecular weight (Mn) of 11,200 as measured by GPC and a weight average molecular weight of 21,200.

Production of copolymers S-2 to S-6

Copolymers S-2, S-3, S-4, S-5 and S-6 were produced in the same manner as in the above production of copolymer S-1, except that the dropped mix components were changed as specified in Table 1, and the properties of these copolymers (solutions) were measured in the same manner as above.

The results are collectively given in Table 1.

TABLE 1

| Type of polymer | S-1 | S-2 | S-3 | S-4 | S-5 | S-6 |
| --- | --- | --- | --- | --- | --- | --- |
| Solvent Xylene | 100 | 100 | 100 | 100 | 100 | 100 |
| Dropped component | | | | | | |
| Tributylsilyl methacrylate | 40 | 45 | 50 | 40 | 50 | |
| Tripropylsilyl methacrylate | | | | | | 40 |
| Methyl methacrylate | 60 | 55 | 50 | 60 | 50 | 50 |
| 2-ethylhexyl acrylate | | | | | | 10 |
| n-octylmercaptan | | | | 2.5 | | |
| 2,2'-azobisiso-butyronitrile | 1.2 | 1.2 | 1.2 | 1.6 | 0.4 | 1.2 |
| Polymerizing temp. (° C.) | 90 | 90 | 90 | 95 | 80 | 90 |
| Properties of product | | | | | | |
| Nonvolatile content (wt %) | 49.9 | 49.7 | 49.6 | 47.9 | 48.4 | 49.3 |
| Viscosity at 25° C. (CPS) | 295 | 277 | 259 | 41 | 690 | 292 |
| GPC measurements | | | | | | |
| Mn | 11200 | 10700 | 10100 | 4900 | 28600 | 11300 |

TABLE 1-continued

| Type of polymer | S-1 | S-2 | S-3 | S-4 | S-5 | S-6 |
|---|---|---|---|---|---|---|
| Mw | 21200 | 19300 | 18700 | 7500 | 98500 | 20900 |
| Mw/Mn | 1.89 | 1.80 | 1.85 | 1.53 | 3.44 | 1.85 |
| Tg (° C.) | 51 | 46 | 40 | 48 | 43 | 43 |

Types and physical properties of compatible (meth) acrylic ester polymer solution to be used as a polymer component in the preparation of compositions [nonvolatile content (weight %/polymer solution) as well as viscosity (Gardner at 25° C.), molecular weight (Mn: measured by GPC), acid value (AV) and glass transition temperature (Tg ° C.) of compatible (meth)acrylic ester polymer contained in the polymer component] are measured.

The results are shown in Table 2.

TABLE 2

Type of compatible (meth)acrylic ester polymer component and polymer properties

| Item No. (abbr.) | Monomer composition (wt. ratio) 100 pts. wts. in total | Solvent | Non-volatile content (wt %) | Viscosity (Gardner) at 25° C. | Mol. wt. Mn/GPC | Acid value | Tg (° C.) |
|---|---|---|---|---|---|---|---|
| BL-1 | *1 = 30/30/30/10 | Xylene | 50 | $A_4$ | 2000 | <1 | 46 |
| BL-2 | | Xylene | 50 | F | 5000 | <1 | 59 |
| BL-3 | | Xylene | 50 | $Z_4$ | 46000 | <1 | 78 |
| BL-4 | *2 = 60/40 | Xylene | 45 | U | 23000 | <1 | 49 |
| BL-5 | *3 = 100 (homopolymer) | Xylene | 50 | G | 3000 | <1 | 61 |
| BL-6 | *4 = 100 (homopolymer) | Xylene | 50 | R | 14000 | <1 | 62 |
| BL-7 | *5 = 75/25 | Xylene | 50 | O | 13000 | <1 | 21 |

*1: Isobutyl methacrylate (i-BMA)/t-butyl methacrylate (t-BMA)/styrene (ST)/stearyl methacrylate (SLMA)
*2: Butyl methacrylate (BMA)/methyl methacrylate (MMA)
*3: Methyl methacrylate (MMA)
*4: Ethyl methacrylate (EMA)
*5: Ethyl methacrylate (EMA)/butyl acrylate (BA)

Examples 1 to 33, Referential Examples 1 and 2 and Comparative Examples 1 to 3

Productive example of antifouling coating composition

Antifouling coating compositions were produced in accordance with the formulations specified in Tables 3 to 10 (the amount of each component is expressed by "parts by weight").

In the production of each of the antifouling coating compositions of the formulations of Tables 3 to 10, the components were combined and shaken for 2 hr in a paint shaker packed with glass beads. The resultant matter was aged at room temperature for 12 hr and filtered through a 100-mesh filter, thereby obtaining the desired antifouling coating composition.

With respect to each of the antifouling coating compositions, the viscosities (Ku value/25° C.) just after production and after storage at room temperature for one month measured with the use of Stormer viscometer are collectively given in Tables 11 and 12.

Evaluation of antifouling properties, degree of consumption and physical properties A sandblasted plate of 70×200×3 mm was provided which had been machined to effect a bending enabling mounting on the side of a rotary drum installed in the seawater in the Bay of Hiroshima. An epoxy-based zinc-rich primer (content of zinc powder in dried coating film: 80% by weight), a tar epoxy-based anticorrosive paint and a vinyl binder coat were successively applied in this order to the sandblasted plate so that the respective film thicknesses were 20, 150 and 50 μm, respectively, in the dry state. Thereafter, each antifouling coating composition to be tested was applied to the coated plate so that its thickness was 200 μm in the dry state, thereby obtaining a specimen plate.

This specimen plate was mounted on the rotary drum, which was rotated at a peripheral speed of 15 knots and at a 50% operation (alternate operation comprising 12-hr working during the night and 12-hr stop during the daytime) for 12 months to thereby simulate ship plying. Thereafter, the antifouling properties (dynamic antifouling properties, adhered area % as ratio of area with various aquatic organisms adhering to specimen plate), the degree of consumption μ (thickness decrease) and physical properties were evaluated.

The results are shown in Tables 11 and 12.

The component designations used in the Tables are as follows:

(1) "TOYOPARAX 150"
chlorinated paraffin produced by Tosoh Corporation, having an average of 14.5 carbon atoms, a chlorine content (quantity) of 50%, a viscosity of 12 ps/25° C. and a specific gravity of 1.25/25° C.;

(2) "TOYOPARAX A-40"
chlorinated paraffin produced by Tosoh Corporation, having an average of 24.5 carbon atoms, a chlorine content (quantity) of 40.5%, a viscosity of 18.5 ps/25° C. and a specific gravity of 1.16/25° C.;

(3) "TOYOPARAX 270"
chlorinated paraffin produced by Tosoh Corporation, having an average of 12 carbon atoms, a chlorine content (quantity) of 70%, a viscosity of 4 ps/80° C. and a specific gravity of 1.50/80° C.;

(4) "TOYOPARAX A-70"

chlorinated paraffin produced by Tosoh Corporation, having an average of 24.5 carbon atoms, a chlorine content (quantity) of 70% and a specific gravity of 1.65/25° C. and being white powder;

(5) "MOLECULAR SIEVE 4A"

synthetic zeolite powder as dehydrating agent produced by Union Showa K.K.;

(6) "DISPARON 305"

antisagging agent based on hydrogenated castor oil produced by Kusumoto Chemicals, Ltd.;

(7) "DISPARON 4200–20"

antisettling agent based on polyethylene oxide in the form of 20% xylene paste, produced by Kusumoto Chemicals, Ltd.; and (8) "Mica SHIRATAMA"

flake pigment of 15 μm in average particle size and 40 in aspect ratio produced by Wakimoto Unmo.

In the Tables, "chlorinated paraffin, wt. % (vs. copolymer)", "$Cu_2O$, wt. % (vs. copolymer, i.e., vs. film forming copolymer, same below)", "ZnO, wt. % (vs. copolymer)", etc. are calculated as follows.

For example, with respect to "antifouling coating composition P-1", "chloroparaffin (chlorinated paraffin) content, wt. % (vs. copolymer)" of 30.8 is calculated as follows.

That is, "antifouling coating composition P-1"contains 4 parts by weight of chlorinated paraffin and 26 parts by weight of "copolymer component (solution) S-1", and 49.9% by weight of nonvolatile content (copolymer S-1) is contained in the 26 parts by weight of "copolymer component (solution) S-1". Therefore, in "antifouling coating composition P-1", "chlorinated paraffin, wt. % (vs. copolymer)"=[4/{26×49.9/100}]×100%=30.8% by weight.

TABLE 3

| Component | P-1 | P-2 | P-3 | P-4 | P-5 | P-6 |
|---|---|---|---|---|---|---|
| Copolymer component*[1] (parenthesized: nonvolatile content, wt %) | | | | | | |
| S-1 (49.9 wt %) | 26 | | | | | |
| S-2 (49.7 wt %) | | 26 | | | | |
| S-3 (49.6 wt %) | | | 26 | | | |
| S-4 (47.9 wt %) | | | | 26 | | |
| S-5 (48.4 wt %) | | | | | 26 | |
| S-6 (49.3 wt %) | | | | | | 26 |
| Chloroparaffin Toyoparax 150 | 4 | 4 | 4 | 4 | 4 | 4 |
| Coloring pigment | | | | | | |
| Red iron oxide | 1 | 1 | 1 | 1 | 1 | 1 |
| Titanium dioxide | 1 | 1 | 1 | 1 | 1 | 1 |
| Cuprous oxide ($Cu_2O$) | 42 | 42 | 42 | 42 | 42 | 42 |
| Zinc oxide (ZnO) | 10 | 10 | 10 | 10 | 10 | 10 |
| DISPARON 305 | 0.5 | 0.5 | 0.5 | 0.5 | 0.5 | 0.5 |
| DISPARON 4200-20 | 1 | 1 | 1 | 1 | 1 | 1 |
| Xylene | 14.5 | 14.5 | 14.5 | 14.5 | 14.5 | 14.5 |
| In total (unit: pts. wt.) | 100 | 100 | 100 | 100 | 100 | 100 |
| Chloroparaffin, wt % (vs. copolymer)*[2] | 30.8 | 31.0 | 31.0 | 32.1 | 31.8 | 31.2 |

TABLE 3-continued

| Component | P-1 | P-2 | P-3 | P-4 | P-5 | P-6 |
|---|---|---|---|---|---|---|
| $Cu_2O$, wt % (vs. copolymer) | 324 | 325 | 326 | 337 | 334 | 328 |
| ZnO, wt % (vs. copolymer) | 62 | 62 | 62 | 64 | 64 | 62 |

Note
*[1]Copolymer component = film forming copolymer solution.
*[2]vs. copolymer = versus film forming copolymer.

TABLE 4

| Component | C-1 | C-2 | C-3 |
|---|---|---|---|
| Copolymer component (nonvolatile content: wt %) S-2 (49.7 wt %) | 28 | 24 | 22 |
| Chloroparaffin TOYOPARAX 150 | 3 | 5 | 6 |
| Coloring pigment | | | |
| Red iron oxide | 1 | 1 | 1 |
| Titanium dioxide | 1 | 1 | 1 |
| Cuprous oxide ($Cu_2O$) | 42 | 42 | 42 |
| Zinc oxide (ZnO) | 10 | 10 | 10 |
| DISPARON 305 | 0.5 | 0.5 | 0.5 |
| DISPARON 4200-20 | 1 | 1 | 1 |
| Xylene | 13.5 | 15.5 | 16.5 |
| In total (unit: pts. wt.) | 100 | 100 | 100 |
| Chloroparaffin, wt % (vs. copolymer) | 21.6 | 41.9 | 54.9 |
| $Cu_2O$, wt % (vs. copolymer) | 302 | 352 | 384 |
| ZnO, wt % (vs. copolymer) | 57 | 67 | 73 |

TABLE 5

| Component | K-1 | K-2 | K-3 |
|---|---|---|---|
| Copolymer component (nonvolatile content: wt %) S-2 (49.7 wt %) | 28 | 28 | 28 |
| Chloroparaffin | | | |
| TOYOPARAX A40 | 3 | | |
| TOYOPARAX 270 | | 3 | |
| TOYOPARAX A70 | | | 3 |
| Coloring pigment | | | |
| Red iron oxide | 1 | 1 | 1 |
| Titanium dioxide | 1 | 1 | 1 |
| Cuprous oxide ($Cu_2O$) | 42 | 42 | 42 |
| Zinc oxide (ZnO) | 10 | 10 | 10 |
| DISPARON 305 | 0.5 | 0.5 | 0.5 |
| DISPARON 4200-20 | 1 | 1 | 1 |
| Xylene | 13.5 | 13.5 | 13.5 |
| In total (unit: pts. wt.) | 100 | 100 | 100 |
| Chloroparaffin, wt % (vs. copolymer) | 21.6 | 21.6 | 21.6 |
| $Cu_2O$, wt % (vs. copolymer) | 302 | 302 | 302 |
| ZnO, wt % (vs. copolymer) | 57 | 57 | 57 |

TABLE 6

| Component (parenthesized: nonvolatile content, wt %) | A-1 | A-2 | A-3 | A-4 |
|---|---|---|---|---|
| Copolymer component S-3 (49.6 wt %) | 22 | 20 | 20 | 16 |
| Chloroparaffin TOYOPARAX 150 | 4 | 4 | 2 | 1 |
| Compatible (meth)acrylic ester polymer component BL-2 (50 wt %) | 4 | 6 | 10 | 16 |
| Coloring pigment | | | | |
| Red iron oxide | 1 | 1 | 1 | 1 |

TABLE 6-continued

| Component (parenthesized: nonvolatile content, wt %) | A-1 | A-2 | A-3 | A-4 |
|---|---|---|---|---|
| Titanium dioxide | 1 | 1 | 1 | 1 |
| Cuprous oxide ($Cu_2O$) | 42 | 42 | 42 | 42 |
| Zinc pyrithione | 2 | 2 | 2 | 2 |
| Zinc oxide (ZnO) | 8 | 8 | 8 | 9 |
| MOLECULAR SIEVE | 1 | 1 | 1 | 1 |
| DISPARON 305 | 0.5 | 0.5 | 0.5 | 0.5 |
| DISPARON 4200-20 | 1 | 1 | 1 | 1 |
| Xylene | 13.5 | 13.5 | 11.5 | 10.5 |
| In total (unit: pts. wt.) | 100 | 100 | 100 | 100 |
| Chloroparaffin, wt % (vs. copolymer) | 36.7 | 40.3 | 20.2 | 12.6 |
| Compatible (meth)acrylic ester polymer, wt % (vs. copolymer) | 18.3 | 30.2 | 50.4 | 101 |
| $Cu_2O$, wt % (vs. copolymer) | 385 | 423 | 423 | 529 |
| ZnO, wt % (vs. copolymer) | 73 | 81 | 81 | 101 |

TABLE 7

| Component (parenthesized: nonvolatile content, wt %) | B-1 | B-2 | B-3 | B-4 | B-5 | B-6 | B-7 |
|---|---|---|---|---|---|---|---|
| Copolymer component S-3 (49.6 wt %) | 19 | 19 | 19 | 13 | 13 | 19 | 19 |
| Chloroparaffin TOYOPARAZ 150 | 3 | 3 | 3 | 4 | 4 | 3 | 3 |
| Compatible (meth)acrylic ester polymer component (parenthesized: non-volatile content, wt %) | | | | | | | |
| BL-1 (50 wt %) | 9 | | | | | | |
| BL-2 (50 wt %) | | 9 | | | | | |
| BL-3 (50 wt %) | | | 9 | | | | |
| BL-4 (45 wt %) | | | | 14.5 | | | |
| BL-5 (50 wt %) | | | | | 13 | | |
| BL-6 (50 wt %) | | | | | | 9 | |
| BL-7 (50 wt %) | | | | | | | 9 |
| Coloring pigment | | | | | | | |
| Red iron oxide | 1 | 1 | 1 | 1 | 1 | 1 | 1 |
| Titanium dioxide | 1 | 1 | 1 | 1 | 1 | 1 | 1 |
| Cuprous oxide ($Cu_2O$) | 42 | 42 | 42 | 42 | 42 | 42 | 42 |
| Zinc pyrithione | 2 | 2 | 2 | 2 | 2 | 2 | 2 |
| Zinc oxide (ZnO) | 8 | 8 | 8 | 8 | 8 | 8 | 8 |
| MOLECULAR SIEVE 4A | 1 | 1 | 1 | 1 | 1 | 1 | 1 |
| DISPARON 305 | 0.5 | 0.5 | 0.5 | 0.5 | 0.5 | 0.5 | 0.5 |
| DISPARON 4200-20 | 1 | 1 | 1 | 1 | 1 | 1 | 1 |
| Xylene | 12.5 | 12.5 | 12.5 | 12 | 13.5 | 12.5 | 12.5 |
| In total (unit: pts. wt.) | 100 | 100 | 100 | 100 | 100 | 100 | 100 |
| Chloroparaffin, wt % (vs. copolymer) | 31.8 | 31.8 | 31.8 | 62.0 | 62.0 | 31.8 | 31.8 |
| Compatible (meth)acrylic ester polymer, wt % (vs. copolymer) | 47.8 | 47.8 | 47.8 | 101 | 101 | 47.8 | 47.8 |
| $Cu_2O$, wt % (vs. copolymer) | 446 | 446 | 446 | 651 | 651 | 446 | 446 |
| ZnO, wt % (vs. copolymer) | 85 | 85 | 85 | 124 | 124 | 85 | 85 |

TABLE 8

| Component (parenthesized: nonvolatile content, wt %) | M-1 | M-2 | M-3 | M-4 |
|---|---|---|---|---|
| Copolymer component S-2 (49.7 wt %) | 26 | 26 | 26 | 26 |
| Chloroparaffin TOYOPARAX 150 | 4 | 4 | 4 | 4 |
| Flake pigment | | | | |
| Mica SHIRATAMA | 2 | 4 | 6 | 8 |
| Coloring pigment | | | | |
| Red iron oxide | 1 | 1 | 1 | 1 |

TABLE 8-continued

| Component (parenthesized: nonvolatile content, wt %) | M-1 | M-2 | M-3 | M-4 |
|---|---|---|---|---|
| Titanium dioxide | 1 | 1 | 1 | 1 |
| Cuprous oxide ($Cu_2O$) | 42 | 42 | 42 | 42 |
| Zinc pyrithione | 2 | 2 | 2 | 2 |
| Zinc oxide (ZnO) | 6 | 4 | 2 | 2 |
| MOLECULAR SIEVE | 1 | 1 | 1 | 1 |
| DISPARON 305 | 0.5 | 0.5 | 0.5 | 0.5 |
| DISPARON 4200-20 | 1 | 1 | 1 | 1 |
| Xylene | 13.5 | 13.5 | 13.5 | 11.5 |
| In total (unit: pts. wt.) | 100 | 100 | 100 | 100 |
| Chloroparaffin, wt % (vs. copolymer) | 31.0 | 31.0 | 31.0 | 31.0 |
| Mica, wt % (vs. copolymer) | 15.5 | 31.0 | 46.4 | 61.9 |
| $Cu_2O$, wt % (vs. copolymer) | 325 | 325 | 325 | 325 |
| ZnO, wt % (vs. copolymer) | 46.4 | 31.0 | 15.5 | 15.5 |

TABLE 9

| Component (parenthesized: nonvolatile content, wt %) | T-1 | T-2 | T-3 | T-4 | T-5 | T-6 |
|---|---|---|---|---|---|---|
| Copolymer component | | | | | | |
| S-2 (49.7 wt %) | 20 | | | | | |
| S-3 (49.6 wt %) | | 20 | 19 | 20 | 21 | 20 |
| Chloroparaffin TOYOPARAX 150 | 4 | 4 | 3 | 2 | 1 | 4 |
| Compatible (meth)acrylic ester polymer component (parenthesized: non- | | | | | | |

TABLE 9-continued

| Component (parenthesized: nonvolatile content, wt %) | T-1 | T-2 | T-3 | T-4 | T-5 | T-6 |
|---|---|---|---|---|---|---|
| volatile content, wt %) | | | | | | |
| BL-2 (50 wt %) | 6 | 6 | | | | |
| BL-1 (50 wt %) | | | 9 | 10 | 11 | |
| BL-5 (50 wt %) | | | | | | 6 |
| Flake pigment Mica SHIRATAMA | 2 | 2 | 2 | 2 | 1 | 3 |
| Coloring pigment | | | | | | |
| Red iron oxide | 1 | 1 | 1 | 1 | 1 | 1 |
| Titanium dioxide | 1 | 1 | 1 | 1 | 1 | 1 |
| Cuprous oxide ($Cu_2O$) | 42 | 42 | 42 | 42 | 42 | 42 |
| Zinc pyrithione | 2 | 2 | 2 | 2 | 2 | 2 |
| Zinc oxide (ZnO) | 6 | 6 | 6 | 6 | 6 | 6 |

TABLE 9-continued

| Component (parenthesized: nonvolatile content, wt %) | T-1 | T-2 | T-3 | T-4 | T-5 | T-6 |
|---|---|---|---|---|---|---|
| MOLECULAR SIEVE | 1 | 1 | 1 | 1 | 1 | 1 |
| DISPARON 305 | 0.5 | 0.5 | 0.5 | 0.5 | 0.5 | 0.5 |
| DISPARON 4200-20 | 1 | 1 | 1 | 1 | 1 | 1 |
| Xylene | 13.5 | 13.5 | 12.5 | 11.5 | 11.5 | 12.5 |
| In total (unit: pts. wt.) | 100 | 100 | 100 | 100 | 100 | 100 |
| Chloroparaffin, wt % (vs. copolymer) | 40.2 | 40.2 | 31.8 | 20.2 | 9.6 | 40.3 |
| Compatible (meth)acrylic ester polymer, wt % (vs. copolymer) | 30 2 | 30.2 | 47.8 | 50.4 | 52.8 | 30.2 |
| Mica, wt % (vs. copolymer) | 20.1 | 20.2 | 21.2 | 20.2 | 9.6 | 30.2 |
| $Cu_2O$, wt % (vs. copolymer) | 423 | 423 | 446 | 423 | 403 | 423 |
| ZnO, wt % (vs. copolymer) | 60 | 60 | 64 | 60 | 58 | 60 |

TABLE 10

| Component | HKL-1 | HKL-2 | HK-1 | HK-2 | HK-3 |
|---|---|---|---|---|---|
| Copolymer component (parenthesized: nonvolatile content, wt %) | S-2 (49.7 wt %) | | Tin-contg. copolymer component*[1] | Tin-contg. copolymer component*[2] | |
| Qty. (pts. wt.) | 30 | 34 | 30 | 30 | |
| Chloroparaffin Toyoparax 150 | 2 | — | | | 2 |
| Compatible (meth)acrylic ester polymer component DL 4 | | | | | 33 |
| Coloring pigment | | | | | |
| Red iron oxide | 1 | 1 | 1 | 1 | 1 |
| Titanium oxide | 1 | 1 | 1 | 1 | 1 |
| Cuprous oxide ($Cu_2O$) | 42 | 42 | 42 | 42 | 42 |
| Zinc pyrithione | | | | | |
| Zinc oxide (ZnO) | 10 | 10 | 10 | 10 | 10 |
| Molecular sieve 4A | | | | | |
| Disparon 305 | 0.5 | 0.5 | 0.5 | 0.5 | 0.5 |
| Disparon 4200-20 | 1 | 1 | 1 | 1 | 1 |
| Xylene | 12.5 | 10.3 | 14.5 | 14.5 | 9.5 |
| In total (unit pts. wt.) | 100 | 100 | 100 | 100 | 100 |
| Chloroparaffin, wt % (vs. copolymer) | 13.4 | 0 | | | |

*[1]Tin-contg. copolymer: TBTMA (tributyltin methacrylate)/MMA = 51/49 (polymer component units composition, wt. ratio), MW = 35,000, solvent: xylene and N.V. = 49.8 wt %.
*[2]Tin-cont. copolymer: TBTMA (tributyltin methacrylate)/MMA = 55/45 (polymer component units composition, wt. ratio), MW = 38,000, solvent: xylene and N.V. = 49.9 wt %.

TABLE 11

| Ex. | Coatg. compsn. No. | Ku value/25° C. Just after prod. | 1 mo. later | Antifouling prop. (adhered area %) | Deg. of consumption ($\mu$) | Prop. rank |
|---|---|---|---|---|---|---|
| 1 | P-1 | 83 | 103 | 5 | 32 | 5 |
| 2 | P-2 | 82 | 100 | 0 | 63 | 6 |
| 3 | P-3 | 80 | 100 | 0 | 102 | 6 |
| 4 | P-4 | 75 | 85 | 0 | 51 | 6 |
| 5 | P-5 | 100 | 140 | 5 | 30 | 3 |
| 6 | P-6 | 78 | 135 | 0 | 42 | 5 |

TABLE 11-continued

| | | Ku value/25° C. | | | Deg. of | |
| | Coatg. | Just after | 1 mo. | Antifouling prop. | consumption | Prop. |
| Ex. | compsn. No. | prod. | later | (adhered area %) | ($\mu$) | rank |
|---|---|---|---|---|---|---|
| 7 | C-1 | 82 | 106 | 0 | 64 | 6 |
| 8 | C-2 | 83 | 98 | 0 | 63 | 8 |
| 9 | C-3 | 82 | 92 | 0 | 60 | 9 |
| 10 | K-1 | 83 | 101 | 0 | 62 | 6 |
| 11 | K-2 | 85 | 115 | 0 | 49 | 7 |
| 12 | K-3 | 86 | 112 | 5 | 38 | 7 |
| 13 | A-1 | 69 | 70 | 0 | 87 | 7 |
| 14 | A-2 | 67 | 68 | 0 | 61 | 8 |
| 15 | A-3 | 66 | 66 | 5 | 39 | 9 |
| 16 | A-4 | 66 | 66 | 10 | 29 | 10 |
| 17 | B-1 | 67 | 68 | 0 | 59 | 7 |
| 18 | B-2 | 68 | 70 | 0 | 42 | 8 |
| 19 | B-3 | 80 | 83 | 5 | 31 | 9 |
| 20 | B-4 | 74 | 76 | 5 | 36 | 8 |
| 21 | B-5 | 67 | 70 | 0 | 62 | 7 |
| 22 | B-6 | 73 | 77 | 5 | 39 | 7 |
| 23 | B-7 | 72 | 75 | 5 | 38 | 7 |
| 24 | M-1 | 75 | 80 | 0 | 54 | 7 |
| 25 | M-2 | 76 | 80 | 0 | 43 | 8 |
| 26 | M-3 | 80 | 83 | 5 | 39 | 9 |
| 27 | M-4 | 84 | 87 | 15 | 22 | 10 |
| 28 | T-1 | 70 | 73 | 0 | 43 | 10 |
| 29 | T-2 | 71 | 71 | 0 | 55 | 10 |
| 30 | T-3 | 70 | 70 | 0 | 51 | 10 |
| 31 | T-4 | 70 | 70 | 0 | 52 | 10 |
| 32 | T-5 | 67 | 68 | 0 | 54 | 10 |
| 33 | T-6 | 67 | 69 | 0 | 66 | 10 |

TABLE 12

| | | Ku value/25° C. | | | Deg. of | |
| | Coatg. | Just after | 1 mo. | Antifouling prop. | consumption | Prop. |
| | compsn. No. | prod. | later | (adhered area %) | ($\mu$) | rank |
|---|---|---|---|---|---|---|
| Ref. Ex. | | | | | | |
| 1 | HKL-1 | 84 | 114 | 0 | 64 | 2 |
| 2 | HKL-2 | 86 | 123 | 0 | 66 | 1 |
| Comp. Ex. | | | | | | |
| 1 | HK-1 | 95 | 100 | 80 | 20 | 6 |
| 2 | HK-2 | 93 | 99 | 0 | 47 | 8 |
| 3 | HK-3 | 90 | 90 | 100 | 3 | 10 |

Criterion for property evaluation

Criterion for property evaluation indicated in Tables 11 and 12 is listed in Table 13.

TABLE 13

| (marks) | Criteria for prop. evaluation |
|---|---|
| 10 mks. | No crack is observed through a microscope of 200 magnifications. |
| 9 | Minute cracks are observed at only very few parts through a microscope of 200 magnifications. |
| 8 | Minute cracks are partially observed through a microscope of 200 magnifications. |
| 7 | Although minute cracks are observed on the whole area through a microscope of 200 magnifications, these are not recognized by unaided eyes. |
| 6 | Although prominent cracking is observed through a microscope of 200 magnifications, no crack is recognized by unaided eyes. |
| 5 | Minute cracks are observed by unaided eyes. |
| 4 | Although cracks are observed by unaided eyes, the degree of cracking is such that cracks are located only in the layer of antifouling coating film. |
| 3 | Cracks are clearly observed by unaided eyes, which are also located in the vinyl binder coating. |
| 2 | Prominent cracking is observed by unaided eyes and film warping (blooming) is recognized around the cracks. |
| 1 | Prominent cracking is observed by unaided eyes and it is recognized that peeling in blooming form (in |

TABLE 13-continued

| (marks) | Criteria for prop. evaluation |
|---|---|
| | the form of open petals) is also caused by film warping. |

Examples 34 to 58, Referential Examples 4 to 5 and Comparative Examples 4 to 6

Productive example of antifouling coating composition

In addition to the antifouling coating compositions of the formulations of the above Tables, antifouling coating compositions were produced in the same manner as in the above examples in accordance with the formulations specified in Tables 14 to 18 shown below (the amount of each component is expressed by "parts by weight").

With respect to each of the antifouling coating compositions, the viscosities (Ku value/25° C.) just after production and after storage at room temperature for one month and six months measured with the use of Stormer viscometer are collectively given in Tables 19 and 20.

Evaluation of antifouling properties, degree of consumption and physical properties Each of these antifouling coating compositions was applied to thereby obtain a specimen plate in the same manner as in the above examples, and the antifouling properties (dynamic antifouling properties, adhered area % as ratio of area with various aquatic organisms adhering thereto to specimen plate), the degree of consumption $\mu$ (thickness decrease) and physical properties were evaluated in the same manner as in the above examples.

The results are shown in Tables 19 and 20. The criterion for property evaluation indicated in the Tables is as set forth hereinbefore.

TABLE 14

| Component | P-7 | P-8 | P-9 | P-10 | P-11 | P-12 |
|---|---|---|---|---|---|---|
| Copolymer component*¹ (parenthesized: non-volatile content, wt %) | | | | | | |
| S-1 (49.9 wt %) | 26 | | | | | |
| S-2 (49.7 wt %) | | 26 | | | | |
| S-3 (49.6 wt %) | | | 26 | | | |
| S-4 (47.9 wt %) | | | | 26 | | |
| S-5 (48.4 wt %) | | | | | 26 | |
| S-6 (49.3 wt %) | | | | | | 26 |
| Chloroparaffin TOYOPARAX 150 | 4 | 4 | 4 | 4 | 4 | 4 |
| Coloring pigment | | | | | | |
| Red iron oxide | 1 | 1 | 1 | 1 | 1 | 1 |
| Titanium dioxide | 1 | 1 | 1 | 1 | 1 | 1 |
| Cuprous oxide (Cu₂O) | 42 | 42 | 42 | 42 | 42 | 42 |
| Zinc oxide (ZnO) | 10 | 10 | 10 | 10 | 10 | 10 |
| MOLECULAR SIEVE 4A | 1 | 1 | 1 | 1 | 1 | 1 |
| DISPARON 305 | 0.5 | 0.5 | 0.5 | 0.5 | 0.5 | 0.5 |
| DISPARON 4200-20 | 1 | 1 | 1 | 1 | 1 | 1 |
| Xylene | 13.5 | 13.5 | 13.5 | 13.5 | 13.5 | 13.5 |
| In total (unit: pts. wt.) | 100 | 100 | 100 | 100 | 100 | 100 |

TABLE 14-continued

| Component | P-7 | P-8 | P-9 | P-10 | P-11 | P-12 |
|---|---|---|---|---|---|---|
| Chloroparaffin, wt % (vs. copolymer)*² | 30.8 | 31.0 | 31.0 | 32.1 | 31.8 | 31.2 |
| Cu₂O, wt % (vs. copolymer) | 324 | 325 | 326 | 337 | 334 | 328 |
| ZnO, wt % (vs. copolymer) | 62 | 62 | 62 | 64 | 64 | 62 |

Note
*¹Copolymer component = film forming copolymer solution.
*²Copolymer = film forming copolymer.

TABLE 15

| Component | | C-4 | C-5 | C-6 | M-5 |
|---|---|---|---|---|---|
| Copolymer component (nonvolatile content, wt %) S-2 (49.7 wt %) | | 28 | 24 | 22 | 26 |
| Chloroparaffin TOYOPARAX 150 | | 3 | 5 | 6 | 4 |
| Coloring pigment | | | | | |
| Red iron oxide | | 1 | 1 | 1 | 1 |
| Titanium dioxide | | 1 | 1 | 1 | 1 |
| Cuprous oxide (Cu₂O) | | 42 | 42 | 42 | 42 |
| Flake pigment Mica SHIRATAMA | | — | — | — | 5 |
| Zinc oxide (ZnO) | | 10 | 10 | 10 | 5 |
| MOL SIEVE 4A | | 1 | 1 | 1 | 1 |
| DISPARON 305 | | 0.5 | 0.5 | 0.5 | 0.5 |
| DISPARON 4200-20 | | 1 | 1 | 1 | 1 |
| Xylene | | 12.5 | 14.5 | 15.5 | 13.5 |
| In total (unit: pts. wt.) | | 100 | 100 | 100 | 100 |
| Chloroparaffin, wt % (vs. copolymer) | | 21.6 | 41.9 | 54.9 | 31.0 |
| Cu₂O, wt % (vs. copolymer) | | 302 | 352 | 384 | 325 |
| ZnO, wt % (vs. copolymer) | | 57 | 67 | 73 | 39 |

TABLE 16

| Component | | D-1 | D-2 |
|---|---|---|---|
| Copolymer component (nonvolatile content, wt %) | S-2 (49.7 wt %) | 26 | 26 |
| Chloroparaffin | TOYOPARAX 150 | 4 | 4 |
| Coloring pigment | Red iron oxide | 1 | 1 |
| | Titanium dioxide | 1 | 1 |
| | Cuprous oxide (Cu₂O) | 42 | 42 |
| Flake pigment | Mica SHIRATAMA | — | — |
| | Zinc oxide (ZnO) | — | — |
| Inorg. dehydrating agent | MOL. SIEVE 5A | 1 | — |
| | Anhydrous gypsum (CaSO₄) | — | 2 |
| | DISPARON 305 | 0.5 | 0.5 |
| | DISPARON 4200-20 | 1 | 1 |
| | Xylene | 13.5 | 12.5 |
| In total (unit: pts. wt.) | | 100 | 100 |
| Inorg. dehydrating agent, wt % (vs. copolymer) | | 7.7 | 15 |

TABLE 17

| Component | | K-4 | K-5 | K-6 |
|---|---|---|---|---|
| Copolymer component (nonvolatile content: wt %) | S-2 (49.7 wt %) | 28 | 28 | 28 |
| Chloroparaffin | TOYOPARAX A40 | 3 | | |
| | TOYOPARAX 270 | | 3 | |
| | TOYOPARAX A70 | | | 3 |

TABLE 17-continued

| Component | | K-4 | K-5 | K-6 |
|---|---|---|---|---|
| Coloring pigment | Red iron oxide | 1 | 1 | 1 |
| | Titanium dioxide | 1 | 1 | 1 |
| Cuprous oxide (Cu$_2$O) | | 42 | 42 | 42 |
| Zinc oxide (ZnO) | | 10 | 10 | 10 |
| MOLECULAR SIEVE 4A | | 1 | 1 | 1 |
| DISPARON 305 | | 0.5 | 0.5 | 0.5 |
| DISPARON 4200-20 | | 1 | 1 | 1 |
| Xylene | | 12.5 | 12.5 | 12.5 |
| In total (unit: pts. wt.) | | 100 | 100 | 100 |
| Chloroparaffin, wt % (vs. copolymer) | | 21.6 | 21.6 | 21.6 |
| Cu$_2$O, wt % (vs. copolymer) | | 302 | 302 | 302 |
| ZnO, wt % (vs. copolymer) | | 57 | 57 | 57 |

TABLE 18

| Component | | Z-1 | Z-2 | Z-3 | Z-4 |
|---|---|---|---|---|---|
| Copolymer component (nonvolatile content, wt %) | S-2 (49.7 wt %) | 26 | 26 | 26 | 26 |
| Chloroparaffin | TOYOPARAX 150 | 4 | 4 | 4 | 4 |
| Coloring pigment | Red iron oxide | 1 | 1 | 1 | 1 |
| | Titanium dioxide | 1 | 1 | 1 | 1 |
| Cuprous oxide (Cu$_2$O) | | 42 | 42 | 42 | 42 |
| Zinc oxide (ZnO) | | 10 | 10 | 10 | 10 |
| MOLECULAR SIEVE 4A | | 0.1 | 0.5 | 2.0 | 5.0 |
| DISPARON 305 | | 0.5 | 0.5 | 0.5 | 0.5 |
| DISPARON 4200-20 | | 1 | 1 | 1 | 1 |
| Xylene | | 14.4 | 14 | 12.5 | 9.5 |
| In total (unit: pts. wt.) | | 100 | 100 | 100 | 100 |
| Mol. sieve, wt % (vs. copolymer) | | 0.77 | 3.9 | 15.5 | 38.7 |

TABLE 19

| Ex. | Coatg. compsn. No. | Ku value/25° C. Just after prod. | Ku value/25° C. 1 mo. later | Ku value/25° C. 6 mo. later | Antifouling prop. (adhered area %) | Deg. of consumption ($\mu$) | Prop. rank |
|---|---|---|---|---|---|---|---|
| 34 | P-7 | 71 | 76 | 82 | 5 | 30 | 5 |
| 35 | P-8 | 71 | 72 | 74 | 0 | 62 | 6 |
| 36 | P-9 | 69 | 69 | 70 | 0 | 101 | 6 |
| 37 | P-10 | 65 | 66 | 65 | 0 | 49 | 6 |
| 38 | P-11 | 88 | 96 | 115 | 10 | 28 | 3 |
| 39 | P-12 | 67 | 89 | 101 | 0 | 41 | 5 |
| 40 | C-4 | 71 | 75 | 76 | 0 | 61 | 6 |
| 41 | C-5 | 70 | 72 | 73 | 0 | 60 | 8 |
| 42 | C-6 | 68 | 69 | 69 | 0 | 60 | 9 |
| 43 | M-5 | 77 | 79 | 79 | 0 | 41 | 8 |
| 44 | D-1 | 72 | 74 | 75 | 0 | 61 | 6 |
| 45 | D-2 | 72 | 72 | 72 | 0 | 64 | 5 |
| 46 | K-4 | 71 | 74 | 76 | 0 | 60 | 6 |
| 47 | K-5 | 73 | 81 | 87 | 0 | 47 | 7 |
| 48 | K-6 | 74 | 79 | 83 | 5 | 37 | 7 |
| 49 | Z-1 | 77 | 89 | 95 | 0 | 62 | 6 |
| 50 | Z-2 | 71 | 75 | 78 | 0 | 63 | 6 |
| 51 | Z-3 | 73 | 73 | 74 | 0 | 69 | 6 |
| 52 | Z-4 | 80 | 81 | 80 | 0 | 53 | 5 |
| 53 | T-1 | 70 | 73 | 74 | 0 | 43 | 10 |
| 54 | T-2 | 71 | 71 | 71 | 0 | 55 | 10 |
| 55 | T-3 | 70 | 70 | 71 | 0 | 51 | 10 |
| 56 | T-4 | 70 | 70 | 72 | 0 | 52 | 10 |
| 57 | T-5 | 67 | 68 | 69 | 0 | 54 | 10 |
| 58 | T-6 | 67 | 69 | 70 | 0 | 66 | 10 |

TABLE 20

| Ref. Ex. | Coatg. compsn. No. | Ku value/25° C. Just after prod. | Ku value/25° C. 1 mo. later | Ku value/25° C. 6 mo. later | Antifouling prop. (adhered area %) | Deg. of consumption ($\mu$) | Prop. rank |
|---|---|---|---|---|---|---|---|
| 4 | HKL-1 | 84 | 114 | gelled | 0 | 64 | 2 |
| 5 | HKL-2 | 86 | 123 | gelled | 0 | 66 | 1 |

TABLE 20-continued

| Coatg. compsn. No. | Ku value/25° C. Just after prod. | Ku value/25° C. 1 mo. later | Ku value/25° C. 6 mo. later | Antifouling prop. (adhered area %) | Deg. of consumption ($\mu$) | Prop. rank |
|---|---|---|---|---|---|---|
| Comp. Ex. | | | | | | |
| 4  HK-1 | 95 | 100 | 108 | 80 | 20 | 6 |
| 5  HK-2 | 93 | 99 | 102 | 0 | 47 | 8 |
| 6  HK-3 | 90 | 90 | 91 | 100 | 3 | 10 |

Examples 59 to 81, Referential Examples 6 and 7 and Comparative Examples 7 to 9

Productive example of antifouling coating composition

In addition to the antifouling coating compositions of the formulations of the above Tables, antifouling coating compositions (namely, those listed in Tables 25 and 26) were produced in the same manner as in the above examples in accordance with the formulations specified in Tables 21 to 24 shown below (the amount of each component is expressed by "parts by weight").

With respect to each of the antifouling coating compositions, the viscosities (Ku value/25° C.) just after production and after storage at room temperature for one month and six months measured with the use of Stormer viscometer are collectively given in Tables 25 and 26.

Evaluation of antifouling properties, degree of consumption and physical properties Each of these antifouling coating compositions was applied to thereby obtain a specimen plate in the same manner as in the above examples, and the antifouling properties (dynamic antifouling properties, adhered area % as ratio of area with various aquatic organisms adhering thereto to specimen plate), the degree of consumption $\mu$ (thickness decrease) and physical properties were evaluated in the same manner as in the above examples.

The results are shown in Tables 25 and 26. The criterion for property evaluation indicated in the Tables is as set forth hereinbefore.

Static antifouling property test

An epoxy-based zinc-rich primer (content of zinc powder in coating material: 80% by weight), a tar epoxy-based anticorrosive paint and a vinyl binder coat were successively applied in this order to a sandblasted steel plate of 100× 300×2 mm at one-day intervals so that the respective film thicknesses were 20, 150 and 75 $\mu$m, respectively, in the dry state. Thereafter, each antifouling coating composition to be tested was applied to the coated steel plate so that its thickness was 100 $\mu$m in the dry state, thereby obtaining a specimen plate.

This specimen plate was suspended from a test raft set off the coast of Miyajima so that it positioned at a depth of 1 m. The adherence of slime to the plate was evaluated each of 2, 4, 6 and 12 months later.

The evaluation results are shown in Tables 25 and 26.

Criterion for evaluation (marks)

The criterion for evaluation (marks) on the degree of adherence of slime is as follows:

10: slime adherence is not observed by visual inspection,
9: partial very thin slime is observed by visual inspection,
8: very thin slime is observed,
7: easily removable transparent thin slime layer is observed,
6: easily removable semitransparent slime layer is observed,
5: plate is covered by brown semitransparent slime layer and it is difficult to remove slime,
4: plate is covered by brown slime layer and it is difficult to remove slime,
3: plate is covered by blackish-brown slime layer and it is difficult to remove slime,
2: plate is covered by thick blackish-brown slime layer and it is difficult to remove slime, and
1: plate is covered by thick blackish-brown slime layer and it is extremely difficult to remove slime.

TABLE 21

| Component | P-13 | P-14 | P-15 | P-16 | P-17 | P-18 |
|---|---|---|---|---|---|---|
| Copolymer component (parenthesized: non-volatile content, wt %) | | | | | | |
| S-1 (49.9 wt %) | 26 | | | | | |
| S-2 (49.7 wt %) | | 26 | | | | |
| S-3 (49.6 wt %) | | | 26 | | | |
| S-4 (47.9 wt %) | | | | 26 | | |
| S-5 (48.4 wt %) | | | | | 26 | |
| S-6 (49.3 wt %) | | | | | | 26 |
| Chloroparaffin TOYOPARAX 150 | 4 | 4 | 4 | 4 | 4 | 4 |
| Coloring pigment | | | | | | |
| Red iron oxide | 1 | 1 | 1 | 1 | 1 | 1 |
| Titanium dioxide | 1 | 1 | 1 | 1 | 1 | 1 |
| Cuprous oxide (Cu$_2$O) | 42 | 42 | 42 | 42 | 42 | 42 |
| Zinc pyrithione | 2 | 2 | 2 | 2 | 2 | 2 |
| Zinc oxide (ZnO) | 8 | 8 | 8 | 8 | 8 | 8 |
| DISPARON 305 | 0.5 | 0.5 | 0.5 | 0.5 | 0.5 | 0.5 |
| DISPARON 4200-20 | 1 | 1 | 1 | 1 | 1 | 1 |
| Xylene | 14.5 | 14.5 | 14.5 | 14.5 | 14.5 | 14.5 |
| In total (unit: pts. wt.) | 100 | 100 | 100 | 100 | 100 | 100 |
| Chloroparaffin, wt % (vs. copolymer) | 30.8 | 31.0 | 31.0 | 32.1 | 31.8 | 31.2 |
| Cu$_2$O, wt % (vs. copolymer) | 324 | 325 | 326 | 337 | 334 | 328 |
| ZnO, wt % (vs. copolymer) | 62 | 62 | 62 | 64 | 64 | 62 |

TABLE 22

| Component | C-7 | C-8 | C-9 | M-6 |
|---|---|---|---|---|
| Copolymer component (nonvolatile content, wt %) | 28 | 24 | 22 | 26 |
| S-2 (49.7 wt %) | | | | |
| Chloroparaffin TOYOPARAX 150 | 3 | 5 | 6 | 4 |
| Coloring pigment | | | | |
| Red iron oxide | 1 | 1 | 1 | 1 |
| Titanium dioxide | 1 | 1 | 1 | 1 |
| Cuprous oxide ($Cu_2O$) | 42 | 42 | 42 | 42 |
| Mica SHIRATAMA | — | — | — | 4 |
| Zinc pyrithione | 2 | 2 | 2 | 2 |
| Zinc oxide (ZnO) | 8 | 8 | 8 | 4 |
| DISPARON 305 | 0.5 | 0.5 | 0.5 | 0.5 |
| DISPARON 4200-20 | 1 | 1 | 1 | 1 |
| Xylene | 13.5 | 15.5 | 16.5 | 14.5 |
| In total (unit: pts. wt.) | 100 | 100 | 100 | 100 |
| Chloroparaffin, wt % (vs. copolymer) | 21.6 | 41.9 | 54.9 | 31.0 |
| $Cu_2O$, wt % (vs. copolymer) | 302 | 352 | 384 | 325 |
| ZnO, wt % (vs. copolymer) | 57 | 67 | 73 | 31 |

TABLE 23

| Component | K-7 | K-8 | K-9 |
|---|---|---|---|
| Copolymer component (nonvolatile content: wt %) | 28 | 28 | 28 |
| S-2 (49.7 wt %) | | | |
| Chloroparaffin | | | |
| TOYOPARAX A40 | 3 | | |
| TOYOPARAX 270 | | 3 | |
| TOYOPARAX A70 | | | 3 |
| Coloring pigment | | | |
| Red iron oxide | 1 | 1 | 1 |
| Titanium dioxide | 1 | 1 | 1 |
| Cuprous oxide ($Cu_2O$) | 42 | 42 | 42 |
| Zinc pyrithione | 2 | 2 | 2 |
| Zinc oxide (ZnO) | 8 | 8 | 8 |
| DISPARON 305 | 0.5 | 0.5 | 0.5 |
| DISPARON 4200-20 | 1 | 1 | 1 |
| Xylene | 13.5 | 13.5 | 13.5 |
| In total (unit: pts. wt.) | 100 | 100 | 100 |
| Chloroparaffin, wt % (vs. copolymer) | 21.6 | 21.6 | 21.6 |
| $Cu_2O$, wt % (vs. copolymer) | 302 | 302 | 302 |
| ZnO, wt % (vs. copolymer) | 57 | 57 | 57 |

TABLE 24

| Component | O-1 | O-2 | O-3 | O-4 |
|---|---|---|---|---|
| Copolymer component (nonvolatile content, wt %) | 26 | 26 | 26 | 26 |
| S-2 (49.7 wt %) | | | | |
| Chloroparaffin TOYOPARAX 150 | 4 | 4 | 4 | 4 |
| Coloring pigment | | | | |
| Red iron oxide | 1 | 1 | 1 | 1 |
| Titanium dioxide | 1 | 1 | 1 | 1 |
| Cuprous oxide ($Cu_2O$) | 43.5 | 43 | 39 | 34 |
| Zinc pyrithione | 0.5 | 1 | 5 | 10 |
| Zinc oxide (ZnO) | 8 | 8 | 8 | 8 |
| DISPARON 305 | 0.5 | 0.5 | 0.5 | 0.5 |
| DISPARON 4200-20 | 1 | 1 | 1 | 1 |
| Xylene | 14.5 | 14.5 | 14.5 | 14.5 |
| In total (unit: pts. wt.) | 100 | 100 | 100 | 100 |
| Zinc pyrithione, wt % (vs. copolymer) | 3.9 | 7.7 | 38.7 | 77.4 |

TABLE 25

| Ex. | Coatg. compsn. No. | Ku value/25° C. Just after prod. | Ku value/25° C. 1 mo. later | Antifouling prop. (adhered area %) | Deg. of consumption ($\mu$) | Prop. rank | Slime resistance 2 mo. later | Slime resistance 4 mo. later | Slime resistance 6mo. later | Slime resistance 12 mo. later |
|---|---|---|---|---|---|---|---|---|---|---|
| 59 | P-13 | 87 | 109 | 5 | 35 | 5 | 10 | 9 | 7 | 6 |
| 60 | P-14 | 85 | 108 | 0 | 64 | 6 | 10 | 9 | 8 | 7 |
| 61 | P-15 | 84 | 105 | 0 | 103 | 6 | 10 | 10 | 9 | 7 |
| 62 | P-16 | 80 | 93 | 0 | 53 | 6 | 10 | 10 | 8 | 7 |
| 63 | P-17 | 107 | Gelled | 5 | 31 | 3 | 10 | 7 | 6 | 5 |
| 64 | P-18 | 83 | Gelled | 0 | 44 | 5 | 10 | 8 | 7 | 6 |
| 65 | C-7 | 87 | 115 | 0 | 65 | 6 | 10 | 10 | 8 | 7 |
| 66 | C-8 | 87 | 103 | 0 | 63 | 8 | 10 | 9 | 8 | 7 |
| 67 | C-9 | 86 | 96 | 0 | 63 | 9 | 10 | 9 | 7 | 6 |
| 68 | M-6 | 87 | 110 | 0 | 45 | 8 | 10 | 8 | 7 | 5 |
| 69 | K-7 | 86 | 109 | 0 | 64 | 6 | 10 | 9 | 8 | 7 |
| 70 | K-8 | 91 | 121 | 0 | 51 | 7 | 10 | 8 | 6 | 5 |
| 71 | K-9 | 90 | 115 | 0 | 39 | 7 | 10 | 8 | 6 | 6 |
| 72 | O-1 | 83 | 102 | 0 | 64 | 6 | 10 | 8 | 6 | 5 |
| 73 | O-2 | 85 | 105 | 0 | 65 | 6 | 10 | 9 | 7 | 6 |
| 74 | O-3 | 87 | 111 | 0 | 66 | 6 | 10 | 10 | 9 | 8 |
| 75 | O-4 | 93 | 120 | 0 | 69 | 6 | 10 | 10 | 10 | 9 |
| 76 | T-1 | 70 | 73 | 0 | 43 | 10 | 10 | 8 | 7 | 6 |
| 77 | T-2 | 71 | 71 | 0 | 55 | 10 | 10 | 8 | 8 | 7 |

TABLE 25-continued

| Ex. | Coatg. compsn. No. | Ku value/25° C. Just after prod. | Ku value/25° C. 1 mo. later | Antifouling prop. (adhered area %) | Deg. of consumption ($\mu$) | Prop. rank | Slime resistance 2 mo. later | Slime resistance 4 mo. later | Slime resistance 6mo. later | Slime resistance 12 mo. later |
|---|---|---|---|---|---|---|---|---|---|---|
| 78 | T-3 | 70 | 70 | 0 | 51 | 10 | 10 | 8 | 7 | 6 |
| 79 | T-4 | 70 | 70 | 0 | 52 | 10 | 10 | 8 | 7 | 6 |
| 80 | T-5 | 67 | 68 | 0 | 54 | 10 | 10 | 8 | 7 | 7 |
| 81 | T-6 | 67 | 69 | 0 | 66 | 10 | 10 | 7 | 7 | 7 |

TABLE 25

| | Coatg. compsn. No. | Ku value/25° C. Just after prod. | Ku value/25° C. 1 mo. later | Antifouling prop. (adhered area %) | Deg. of consumption ($\mu$) | Prop. rank | Slime resistance 2 mo. later | Slime resistance 4 mo. later | Slime resistance 6mo. later | Slime resistance 12 mo. later |
|---|---|---|---|---|---|---|---|---|---|---|
| Ref. Ex. | | | | | | | | | | |
| 6 | HKL-1 | 84 | 114 | 0 | 64 | 2 | 5 | 3 | 3 | 3 |
| 7 | HKL-2 | 86 | 123 | 0 | 66 | 1 | 6 | 3 | 3 | 3 |
| Comp. Ex. | | | | | | | | | | |
| 7 | HK-1 | 95 | 100 | 80 | 20 | 6 | 5 | 3 | 1 | 1 |
| 8 | HK-2 | 93 | 99 | 0 | 47 | 8 | 9 | 8 | 6 | 5 |
| 9 | HK-3 | 90 | 90 | 100 | 3 | 10 | 3 | 1 | 1 | 1 |

Examples 82 to 108, Referential Example 8 and Comparative Examples 10 to 12

Productive example of antifouling coating composition

In addition to the antifouling coating compositions of the formulations of the above Tables, antifouling coating compositions (namely, those listed in Tables 31 and 32) were produced in the same manner as in the above examples in accordance with the formulations specified in Tables 27 to 30 shown below (the amount of each component is expressed by "parts by weight").

With respect to each of the antifouling coating compositions, the viscosities (Ku value/25° C.) just after production and after storage at room temperature for one month measured with the use of Stormer viscometer are collectively given in Tables 31 and 32.

Evaluation of antifouling properties, degree of consumption and physical properties Each of these antifouling coating compositions was applied to thereby obtain a specimen plate in the same manner as in the above examples, and the antifouling properties (dynamic antifouling properties, adhered area % as ratio of area with various aquatic organisms adhering thereto to specimen plate), the degree of consumption $\mu$ (thickness decrease) and physical properties were evaluated in the same manner as in the above examples.

The results are shown in Tables 31 and 32. The criterion for property evaluation indicated in the Tables is as set forth hereinbefore.

TABLE 27

| Component | P-19 | P-20 | P-21 | P-22 | P-23 | P-24 |
|---|---|---|---|---|---|---|
| Copolymer component*[1] (parenthesized: non-volatile content, wt %) | | | | | | |
| S-1 (49.9 wt %) | 20 | | | | | |
| S-2 (49.7 wt %) | | 20 | | | | |
| S-3 (49.6 wt %) | | | 20 | | | |
| S-4 (47.9 wt %) | | | | 20 | | |
| S-5 (48.4 wt %) | | | | | 20 | |
| S-6 (49.3 wt %) | | | | | | 20 |
| Compatible (meth)acrylic ester polymer component BL-2 (50 wt %) | 16 | 16 | 16 | 16 | 16 | 16 |
| Coloring pigment | | | | | | |
| Red iron oxide | 1 | 1 | 1 | 1 | 1 | 1 |
| Titanium dioxide | 1 | 1 | 1 | 1 | 1 | 1 |
| Cuprous oxide (Cu$_2$O) | 45 | 45 | 45 | 45 | 45 | 45 |
| Zinc oxide (ZnO) | 10 | 10 | 10 | 10 | 10 | 10 |
| DISPARON 305 | 1 | 1 | 1 | 1 | 1 | 1 |
| DISPARON 4200-20 | 1 | 1 | 1 | 1 | 1 | 1 |
| Xylene | 5 | 5 | 5 | 5 | 5 | 5 |
| In total (unit: pts. wt.) | 100 | 100 | 100 | 100 | 100 | 100 |
| Polymer BL-2, wt % (vs. copolymer)*[2] | 80.2 | 80.5 | 80.6 | 83.5 | 82.6 | 81.1 |

TABLE 27-continued

| Component | P-19 | P-20 | P-21 | P-22 | P-23 | P-24 |
|---|---|---|---|---|---|---|
| Cu₂O, wt % (vs. copolymer) | 451 | 453 | 454 | 470 | 465 | 456 |
| ZnO, wt % (vs. copolymer) | 100 | 101 | 101 | 104 | 103 | 101 |

Note
*¹Copolymer component = film forming copolymer solution.
*²vs. copolymer = versus film forming copolymer.

TABLE 28

| Component (nonvolatile content, wt %) | A-5 | A-6 | A-7 | A-8 |
|---|---|---|---|---|
| Copolymer component S-3 (49.6 wt %) | 28 | 24 | 16 | 12 |
| Compatible (meth)acrylic ester polymer component BL-2 (50 wt %) | 8 | 12 | 20 | 24 |
| Coloring pigment | | | | |
| Red iron oxide | 1 | 1 | 1 | 1 |
| Titanium dioxide | 1 | 1 | 1 | 1 |
| Cuprous oxide (Cu₂O) | 45 | 45 | 45 | 45 |
| Zinc pyrithione | 2 | 2 | 2 | 2 |
| Zinc oxide (ZnO) | 8 | 8 | 8 | 8 |
| MOLECULAR SIEVE 4A | 1 | 1 | 1 | 1 |
| DISPARON 305 | 1 | 1 | 1 | 1 |
| DISPARON 4200-20 | 1 | 1 | 1 | 1 |
| Xylene | 4 | 4 | 4 | 4 |
| In total (unit: pts. wt.) | 100 | 100 | 100 | 100 |
| Polymer BL-2, wt % (vs. copolymer) | 28.8 | 50.4 | 126 | 202 |
| Cu₂O, wt % (vs. copolymer) | 324 | 378 | 567 | 756 |
| ZnO, wt % (vs. copolymer) | 58 | 67 | 101 | 134 |

TABLE 29

| Component (parenthesized: nonvolatile content, wt %) | B-8 | B-9 | B-10 | B-11 | B-12 | B-13 | B-14 |
|---|---|---|---|---|---|---|---|
| Copolymer component S-3 (49.6 wt %) | 20 | 20 | 20 | 20 | 20 | 20 | 20 |
| Compatible (meth)acrylic ester poylmer component (parenthesized: non-volatile content, wt %) | | | | | | | |
| BL-1 (50 wt %) | 16 | | | | | | |
| BL-2 (50 wt %) | | 16 | | | | | |
| BL-3 (50 wt %) | | | 16 | | | | |
| BL-4 (45 wt %) | | | | 18 | | | |
| BL-5 (50 wt %) | | | | | 16 | | |
| BL-6 (50 wt %) | | | | | | 16 | |
| BL-7 (50 wt %) | | | | | | | 16 |
| Coloring pigment | | | | | | | |
| Red iron oxide | 1 | 1 | 1 | 1 | 1 | 1 | 1 |
| Titanium dioxide | 1 | 1 | 1 | 1 | 1 | 1 | 1 |
| Cuprous oxide (Cu₂O) | 42 | 42 | 42 | 42 | 42 | 42 | 42 |
| Zinc pyrithione | 2 | 2 | 2 | 2 | 2 | 2 | 2 |
| Zinc oxide (ZnO) | 8 | 8 | 8 | 8 | 8 | 8 | 8 |
| MOLECULAR SIEVE 4A | 1 | 1 | 1 | 1 | 1 | 1 | 1 |
| DISPARON 305 | 0.5 | 0.5 | 0.5 | 0.5 | 0.5 | 0.5 | 0.5 |
| DISPARON 4200-20 | 1 | 1 | 1 | 1 | 1 | 1 | 1 |
| Xylene | 7.5 | 7.5 | 7.5 | 5.5 | 7.5 | 7.5 | 7.5 |
| In total (unit: pts. wt.) | 100 | 100 | 100 | 100 | 100 | 100 | 100 |
| Compatible (meth)acrylic ester polymer, wt % (vs. copolymer) | 80.6 | 80.6 | 80.6 | 81.7 | 80.6 | 80.6 | 80.6 |
| Cu₂O, wt % (vs. copolymer) | 423 | 423 | 423 | 423 | 423 | 423 | 423 |
| ZnO, wt % (vs. copolymer) | 80.6 | 80.6 | 80.6 | 80.6 | 80.6 | 80.6 | 80.6 |

TABLE 30

| Component (nonvolatile content, wt %) | M-7 | M-8 | M-9 | M-10 | MKL-3 |
|---|---|---|---|---|---|
| Copolymer component S-3 (49.6 wt %) | 28 | 28 | 28 | 28 | 36 |
| Compatible (meth)acrylic ester polymer component | | | | | |
| BL-2 (50 wt %) | 8 | 8 | 8 | 8 | — |
| Coloring pigment | | | | | |
| Red iron oxide | 1 | 1 | 1 | 1 | 1 |
| Titanium dioxide | 1 | 1 | 1 | 1 | 1 |
| Cuprous oxide (Cu₂O) | 45 | 45 | 45 | 45 | 45 |
| Zinc pyrithione | 2 | 2 | 2 | 2 | — |
| Zinc oxide (ZnO) | 6 | 4 | 2 | 2 | 10 |
| Flake pigment | | | | | |
| Mica SHIRATAMA | 2 | 4 | 6 | 8 | — |
| MOLECULAR SIEVE 4A | 1 | 1 | 1 | 1 | — |
| DISPARON 305 | 1 | 1 | 1 | 1 | 0.5 |
| DISPARON 4200-20 | 1 | 1 | 1 | 1 | 1 |
| Xylene | 4 | 4 | 4 | 2 | 5 |
| In total (unit: pts. wt.) | 100 | 100 | 100 | 100 | 100 |
| Polymer BL-2, wt % (vs. copolymer) | 28.8 | 28.8 | 28.8 | 28.8 | |
| Cu₂O, wt % (vs. copolymer) | 324 | 324 | 324 | 324 | |
| ZnO, wt % (vs. copolymer) | 43.2 | 28.8 | 14.4 | 14.4 | |
| Mica, wt % (vs. copolymer) | 14.4 | 28.8 | 43.2 | 57.6 | |

TABLE 31

| Ex. | Coatg. composition No. | Ku value/25° C. Just after prod. | Ku value/25° C. 1 mo. later | Antifouling prop. (adhered area %) | Deg. of consumption ($\mu$) | Prop. rank |
|---|---|---|---|---|---|---|
| 82 | F-19 | 80 | 100 | 10 | 24 | 4 |
| 83 | F-20 | 79 | 97 | 5 | 39 | 5 |
| 84 | F-21 | 79 | 96 | 0 | 61 | 6 |
| 85 | P-22 | 75 | 82 | 0 | 41 | 6 |
| 86 | F-23 | 97 | 138 | 10 | 23 | 3 |
| 87 | F-24 | 76 | 134 | 5 | 38 | 4 |
| 88 | A-5 | 85 | 92 | 0 | 79 | 4 |
| 89 | A-6 | 82 | 88 | 0 | 68 | 5 |
| 90 | A-7 | 77 | 75 | 5 | 29 | 10 |
| 91 | A-8 | 74 | 74 | 10 | 21 | 10 |
| 92 | B-8 | 66 | 67 | 0 | 72 | 5 |
| 93 | B-9 | 66 | 66 | 0 | 63 | 6 |
| 94 | B-10 | 95 | 99 | 5 | 31 | 9 |
| 95 | B-11 | 89 | 93 | 5 | 32 | 7 |
| 96 | B-12 | 67 | 70 | 0 | 79 | 5 |
| 97 | B-13 | 78 | 80 | 5 | 34 | 5 |
| 98 | B-14 | 75 | 76 | 5 | 34 | 5 |
| 99 | M-7 | 86 | 89 | 0 | 64 | 5 |
| 100 | M-8 | 86 | 88 | 0 | 59 | 7 |
| 101 | M-9 | 88 | 90 | 5 | 31 | 9 |
| 102 | M-10 | 91 | 93 | 10 | 25 | 10 |
| 103 | T-1 | 70 | 73 | 0 | 43 | 10 |
| 104 | T-2 | 71 | 71 | 0 | 55 | 10 |
| 105 | T-3 | 70 | 70 | 0 | 51 | 10 |
| 106 | T-4 | 70 | 70 | 0 | 52 | 10 |
| 107 | T-5 | 67 | 68 | 0 | 54 | 10 |
| 108 | T-6 | 67 | 69 | 0 | 66 | 10 |

TABLE 32

| Ref. No. | Coatg. composition No. | Ku value/25° C. Just after prod. | Ku value/25° C. 1 mo. later | Antifouling prop. (adhered area %) | Deg. of consumption ($\mu$) | Prop. rank |
|---|---|---|---|---|---|---|
| 8 | HKL-3 | 83 | 118 | 0 | 124 | 1 |
| Comp. Ex. | | | | | | |
| 10 | HK-1 | 95 | 100 | 80 | 20 | 6 |
| 11 | HK-2 | 93 | 99 | 0 | 47 | 8 |
| 12 | HK-3 | 95 | 100 | 80 | 20 | 10 |

Examples 109 to 155 and Comparative Examples 13 to 19

Productive example of antifouling coating composition

In addition to the antifouling coating compositions of the formulations of the above Tables, antifouling coating compositions (namely, those listed in Tables 36 to 38) were produced in the same manner as in the above examples in accordance with the formulations specified in Tables 34 and 35 shown below (the amount of each component is expressed by "parts by weight").

With respect to each of the thus obtained antifouling coating compositions together with some of the antifouling coating compositions specified in the foregoing tables, the viscosities (Ku value/25° C.) just after production and after storage at room temperature for one month measured with the use of Stormer viscometer are collectively shown in Tables 36 to 38.

The antifouling properties, consumption degree change on standing, physical properties in parts under alternate dry and wet and coating film strength with respect to these antifouling coating compositions were evaluated by the following methods.

The results are shown in Tables 36 to 38.

Evaluation of antifouling properties

The antifouling properties (dynamic antifouling properties, adhered area % as ratio of area with various aquatic organisms adhering thereto to specimen plate) and the degree of consumption $\mu$ (thickness decrease; column marked with ★ in the Tables) were evaluated in the same manner as in the above examples, except that the tested antifouling coating compositions were changed.

Further, the consumption degree change on standing, physical properties in parts under alternate dry and wet and coating film strength were evaluated under the following conditions.

Evaluation of consumption degree change on standing

An epoxy-based zinc-rich primer (content of zinc powder in dry coating film: 80% by weight) was applied to a disk-shaped sandblasted plate of 300 mm in diameter and 3 mm in thickness so that the film thickness was 20 μm in the dry state. On the next day, a tar epoxy-based anticorrosive paint was applied onto the primer film so that the film thickness was 150 μm in the dry state. Further, on the next day, a vinyl binder coat was applied onto the surface of the paint film so that the film thickness was 50 μm in the dry state. The obtained coated plate was dried indoors for 7 days.

Thereafter, each antifouling coating composition to be tested was radially applied to the coated plate in the radius direction thereof by the use of an applicator with a clearance of 500 μm. Thus, a specimen plate was obtained.

Each specimen plate was secured to a motor and rotated in a thermostatic chamber filled with 25° C. seawater at a peripheral speed of 15 knots and at a 100% operation (i.e., continuous operation day and night). The degree of consumption (film thickness decrease) in the vicinity of the circumference was measured a total of 4 times at 3-month intervals.

Evaluation of physical properties in parts under alternate dry and wet

A sandblasted plate of 70 mm×150 mm×2.3 mm was coated in the same manner as in the above "evaluation of antifouling properties", thereby obtaining a specimen plate.

This specimen plate was fixed in a rotary alternate dry and wet tester in which 12-hr immersion in the seawater and 12-hr exposure to air alternated with each other. The tester was operated for 3 months, and the resultant specimen plate was subjected to visual inspection.

The criterion for evaluation is as follows:

5: any cracking and peeling are not observed on the surface of the specimen plate, 4: some tiny cracks are observed on the surface of the specimen plate, 3: tiny cracks are observed on the surface of the specimen plate, 2: clear cracks are observed on the surface of the specimen plate, and 1: clear cracks accompanied by peeling are observed on the surface of the specimen plate.

Evaluation of coating film strength

A tar epoxy-based anticorrosive paint was applied to a sandblasted plate of 70 mm×150 mm×2.3 mm so that the film thickness was 150 μm in the dry state. On the next day, a vinyl binder coat was applied onto the paint film so that the film thickness was 50 μm in the dry state. The coated plate was dried in a 40° C. thermostat for 2 days.

Further, the vinyl binder coat was applied onto the surface of the above dry film so that the film thickness was 50 μm in the dry state.

On the next day, each antifouling coating composition to be tested was applied to the coated plate so that its film thickness was 150 μm in the dry state. Further, on the next day, the same antifouling coating composition was applied so that its film thickness was 150 μm in the dry state (thus, dry coating film formed from the antifouling coating composition had a total thickness of 150+150=300 μm).

The resultant plate was dried in an airconditioned chamber set at 20° C. and 75% in humidity for 14 days.

A polyethylene sheet of 50 mm×50 mm was disposed on the surface of the coating film of the thus obtained specimen plate. A dummy block of 30 mm×30 mm was placed thereon, the coating film was pressed by a load of 30 kg/cm$^2$ for 30 min, and the damage of the coating film was evaluated by visual inspection.

The criterion for evaluation is as follows.

TABLE 33

(Criteria for Evaluation of Coating Film Strength)

| Evaluation | Morphology of coating film | Remark |
|---|---|---|
| 5 | | Block imprints are observed. |
| 4 | | Slight deformation is observed around the block. |
| 3 | | Heap is observed around the block. |
| 2 | | Large heap is observed around the block. |
| 1 | | Large heap is observed around the block, which has been pushed outward. |

The evaluation results are collectively shown in Tables 36 to 38.

TABLE 34

| Component | | AD-1 | AD-2 |
|---|---|---|---|
| Copolymer component*[1] (parenthesized: non-volatile content, wt %) | S-2 (49.7 wt %) | 26 | |
| | S-3 (49.6 wt %) | | 20 |
| Compatible (meth)acrylic ester polymer component | BL-2 (50 wt %) | | 16 |
| Chloroparaffin | TOYOPARAX 150 | 4 | |
| Coloring pigment | Red iron oxide | 1 | 1 |
| | Titanium dioxide | 1 | 1 |
| Cuprous oxide (CU$_2$O) | | 42 | 45 |
| Zinc oxide (ZnO) | | 10 | 10 |
| MOLECULAR SIEVE 4A | | — | — |
| DISPARON 305 | | 0.5 | 1 |
| DISPARON 4200-20 | | 1 | 1 |
| Xylene | | 14.5 | 5 |
| In total (unit: pts. wt.) | | 100 | 100 |
| Chloroparaffin, wt % (vs. copolymer)*[2] | | 31.0 | 31.0 |
| Cu$_2$O, wt % (vs. copolymer) | | 325.0 | 326 |
| ZnO, wt % (vs. copolymer) | | 62 | 62 |

Note
*[1]: Copolymer component = film forming copolymer solution.
*[2]: Copolymer = film forming copolymer.

TABLE 35

| Component | HK-4 | HK-5 | HK-6 | HK-7 | HK-3 | HK-1 | HK-2 |
|---|---|---|---|---|---|---|---|
| Copolymer component (parenthesized: non-volatile content, wt %) | S-1 (49.9) | S-2 (49.7) | S-3 (49.6) | S-3 (49.6) |  | Tin-contg. copolymer component*[1] | Tin-contg. copolymer component*[2] |
| Qty. (pts. wt.) | 26 | 26 | 20 | 20 | — | 30 | 30 |
| Chloroparaffin TOYOPARAX 150 | 4 | 4 |  | 4 | 2 |  |  |
| Compatible (meth)acrylic ester polymer component |  |  |  |  |  |  |  |
| BL-2 |  |  | 16 | 6 |  |  |  |
| BL-4 |  |  |  |  | 33 |  |  |
| Coloring pigment |  |  |  |  |  |  |  |
| Red iron oxide | 1 | 1 | 1 | 1 | 1 | 1 | 1 |
| Titanium oxide | 1 | 1 | 1 | 1 | 1 | 1 | 1 |
| Cuprous oxide ($Cu_2O$) | 52 | 52 | 50 | 48 | 42 | 42 | 42 |
| Flake pigment |  |  |  |  |  |  |  |
| Mica SHIRATAMA |  |  |  | 2 |  |  |  |
| Zinc pyrithione |  |  | 2 | 2 |  |  |  |
| Zinc oxide (ZnO) |  |  |  |  | 10 | 10 | 10 |
| MOLECULAR SIEVE 4A | 1 | 1 | 1 | 1 |  |  |  |
| DISPARON 305 | 0.5 | 0.5 | 0.5 | 0.5 | 0.5 | 0.5 | 0.5 |
| DISPARON 4200-20 | 1 | 1 | 1 | 1 | 1 | 1 | 1 |
| Xylene | 13.5 | 13.5 | 7.5 | 13.5 | 9.5 | 14.5 | 14.5 |
| In total (unit: pts. wt.) | 100 | 100 | 100 | 100 | 100 | 100 | 100 |

*[1]Tin-contg. copolymer: TBTMA (tributyltin methacrylate)/MMA = 51/49 (polymer component units composition, wt. ratio), MW = 35,000, solvent: xylene and N.V. = 49.8 wt %.
*[2]Tin-contg. copolymer: TBTMA (tributyltin methacrylate)/MMA = 55/45 (polymer component units composition, wt. ratio), MW = 38,000, solvent: xylene and N.V. = 49.9 wt %.

TABLE 36

| Ex. | Coatg. compsn. No. | Ku value/25° C. Just after prod. | Ku value/25° C. 1 mo. later | Anti-fouling prop. (adhered area %) | Deg. of consumption vs. time ($\mu$/3 mo.) 1st | 2nd | 3rd | 4th | Test under alternate dry and wet (prop.) | Film strength (test under block pressure) | Deg. of consumption $\mu$ (*) |
|---|---|---|---|---|---|---|---|---|---|---|---|
| 109 | AD-1 | 82 | 100 | 0 | 29 | 28 | 28 | 28 | 5 | 4.5 | 63 |
| 110 | AD-2 | 79 | 96 | 0 | 30 | 27 | 22 | 21 | 5 | 5 | 61 |
| 111 | P-7 | 71 | 76 | 5 | 13 | 13 | 11 | 10 | 5 | 4.5 | 30 |
| 112 | P-8 | 71 | 72 | 0 | 28 | 26 | 27 | 27 | 5 | 4.5 | 62 |
| 113 | P-9 | 69 | 69 | 0 | 43 | 45 | 48 | 49 | 5 | 4 | 101 |
| 114 | P-10 | 65 | 66 | 0 | 19 | 22 | 21 | 20 | 5 | 4.5 | 49 |
| 115 | P-11 | 88 | 96 | 10 | 13 | 11 | 10 | 7 | 5 | 4 | 28 |
| 116 | P-12 | 67 | 89 | 0 | 20 | 17 | 15 | 6 | 5 | 4.5 | 41 |
| 117 | C-4 | 71 | 76 | 0 | 28 | 29 | 27 | 28 | 5 | 5 | 61 |
| 118 | C-5 | 70 | 72 | 0 | 26 | 27 | 27 | 25 | 5 | 4 | 60 |
| 119 | C-6 | 68 | 69 | 0 | 25 | 26 | 24 | 22 | 5 | 3.5 | 60 |
| 120 | K-4 | 71 | 74 | 0 | 27 | 28 | 27 | 25 | 5 | 4.5 | 60 |
| 121 | K-5 | 73 | 81 | 0 | 27 | 24 | 19 | 16 | 5 | 4.5 | 47 |
| 122 | K-6 | 74 | 79 | 5 | 22 | 11 | 7 | 5 | 5 | 5 | 37 |
| 123 | A-5 | 85 | 92 | 0 | 40 | 35 | 30 | 30 | 5 | 5 | 79 |
| 124 | A-6 | 82 | 88 | 0 | 35 | 29 | 25 | 23 | 5 | 5 | 68 |

(*) The deg. of consumption is defined as the extent of film thickness ($\mu$) consumed by a plying simulation conducted at a peripheral speed of 50 knots, at an operation ratio of 50% and for a period of 12 months.

TABLE 37

| Ex. No. | Coatg. compsn. No. | Ku value/ 25° C. Just after prod. | Ku value/ 25° C. 1 mo. later | Anti-fouling prop. (adhered area %) | Deg. of consumption vs. time (μ/3 mo.) 1st | 2nd | 3rd | 4th | Test under alternate dry and wet (prop.) | Film strength (test under block pressure) | Deg. of consumption μ (*) |
|---|---|---|---|---|---|---|---|---|---|---|---|
| 125 | A-7 | 77 | 75 | 5 | 15 | 12 | 8 | 8 | 5 | 5 | 29 |
| 126 | A-8 | 74 | 74 | 10 | 10 | 9 | 7 | 5 | 5 | 5 | 21 |
| 127 | B-8 | 66 | 67 | 0 | 35 | 31 | 32 | 28 | 5 | 4.5 | 72 |
| 128 | B-9 | 66 | 66 | 0 | 32 | 28 | 23 | 20 | 5 | 5 | 63 |
| 129 | B-10 | 95 | 99 | 5 | 18 | 10 | 6 | 6 | 5 | 5 | 31 |
| 130 | B-11 | 89 | 93 | 5 | 19 | 12 | 7 | 5 | 5 | 5 | 32 |
| 131 | B-12 | 67 | 70 | 0 | 39 | 37 | 35 | 36 | 5 | 5 | 79 |
| 132 | B-13 | 78 | 80 | 5 | 19 | 12 | 8 | 7 | 5 | 5 | 34 |
| 133 | B-14 | 75 | 76 | 5 | 18 | 10 | 9 | 6 | 5 | 4.5 | 34 |
| 134 | T-1 | 70 | 73 | 0 | 19 | 20 | 21 | 20 | 5 | 4.5 | 43 |
| 135 | T-2 | 71 | 71 | 0 | 24 | 25 | 25 | 23 | 5 | 4.5 | 55 |
| 136 | T-3 | 70 | 70 | 0 | 23 | 23 | 21 | 22 | 5 | 4.5 | 51 |
| 137 | T-4 | 70 | 70 | 0 | 24 | 21 | 22 | 20 | 5 | 4.5 | 52 |
| 138 | T-5 | 67 | 68 | 0 | 24 | 22 | 19 | 17 | 5 | 5 | 54 |
| 139 | T-6 | 67 | 69 | 0 | 30 | 33 | 30 | 27 | 5 | 4.5 | 66 |

(*) The deg. of consumption is defined as the extent of film thickness (μ) consumed by a plying simulation conducted at a peripheral speed of 50 knots, at an operation ratio of 50% and for a period of 12 months.

TABLE 38

| Comp. Ex. | Coatg. compsn. No. | Ku value/ 25° C. Just after prod. | Ku value/ 25° C. 1 mo. later | Anti-fouling prop. (adhered area %) | Deg. of consumption vs. time (μ/3 mo.) 1st | 2nd | 3rd | 4th | Test under alternate dry and wet (prop.) | Film strength (test under block pressure) | Deg. of consumption μ (*) |
|---|---|---|---|---|---|---|---|---|---|---|---|
| 13 | HK-4 | 68 | 70 | 40 | 12 | 9 | 5 | 3 | 1 | 3 | 23 |
| 14 | HK-5 | 67 | 69 | 20 | 24 | 22 | 19 | 10 | 1 | 2.5 | 51 |
| 15 | HK-6 | 65 | 66 | 20 | 28 | 19 | 14 | 8 | 2 | 3 | 53 |
| 16 | HK-7 | 69 | 69 | 15 | 20 | 15 | 11 | 7 | 2 | 2.5 | 41 |
| 17 | HK-3 | 90 | 90 | 100 | 2 | 1 | 0 | 0 | 5 | 5 | 3 |
| 18 | HK-1 | 95 | 100 | 80 | 7 | 6 | 7 | 6 | 5 | 5 | 20 |
| 19 | HK-2 | 93 | 99 | 0 | 20 | 22 | 20 | 19 | 5 | 5 | 47 |

(*) The deg. of consumption is defined as the extent of film thickness (μ) consumed by applying simulation conducted at a peripheral speed of 50 knots, at an operation ratio of 50% and for a period of 12 months.

INDUSTRIAL APPLICABILITY

The above first, second and third antifouling coating compositions of the present invention are applied once or a plurality of times according to the customary procedure to, for example, the surface of underwater structures (e.g., plumbing port of nuclear power station), the surface of sludge diffusion preventive films for use in public works of various ocean facilities such as bayshore road, undersea tunnel, port facilities and canal/channel or the surface of various shaped items such as ship and fishing gear (e.g., rope and fishing net). Thus, for example, hulls and underwater structures coated with an antifouling coating film having excellent cracking resistance and antifouling properties can be obtained. These antifouling coating compositions may either be directly applied to the surface of hulls and underwater structures or applied to the surface of hulls and underwater structures precoated with an undercoating material such as a rust preventive or a primer. Moreover, these antifouling coating compositions may be applied as a top coat for repair to the surface of hulls and underwater structures previously coated with the conventional antifouling paint or the antifouling coating composition of the present invention. Although the thickness of the coating film thus formed on the surface of hulls and underwater structures is not particularly limited, for example, it ranges from about 30 to 150 μm per application.

What is claimed is:

1. An antifouling coating composition comprising:
    an antifouling agent;
    a film forming copolymer of 1000 to 50,000 in number average molecular weight, from 20 to 65% by weight of the structural units of said copolymer being derived from a trialkylsilyl ester of polymerizable unsaturated carboxylic acid, wherein said trialkylsilyl ester is represented by the following formula (I):

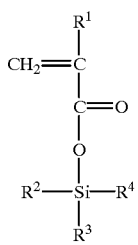

wherein R¹ represents a hydrogen atom or an alkyl group, and each of R², R³ and R⁴, independently, is an alkyl group having 1 to 18 carbon atoms;
    20 to 65 parts by weight per 100 parts by weight of film forming copolymer, of chlorinated paraffin having 8 to 30 carbon atoms, a number average molecular weight of 200 to 1200 and a chlorination ratio (chlorine content) of from 35 to 75% by weight.

2. The antifouling coating composition as claimed in claim 1, which further comprises zinc flower in an amount of 1 to 1000 parts by weight per 100 parts by weight of the film forming copolymer.

3. The antifouling coating composition as claimed in claim 1, wherein the antifouling agent is at least one member selected from the group consisting of copper, copper compounds and zinc pyrithione.

4. The antifouling composition of claim 1 wherein the chlorinated paraffin has from 10 to 26 carbon atoms.

5. The antifouling composition of claim 4 wherein the chlorinated paraffin has a number average molecular weight of 300 to 1100.

6. The antifouling composition of claim 5 wherein the chlorinated paraffin has a chlorination ratio of from 35 to 65%.

7. The antifouling composition of claim 1 wherein the chlorinated paraffin has a viscosity of at least 1 ps at 25° C. and a specific gravity of 1.05 to 1.80, at 25° C.

8. An antifouling coating composition comprising:
    film forming copolymer of 1000 to 50,000 in number average molecular weight, from 20 to 65% by weight of the structural units of said copolymer being derived from a trialkylsilyl ester of polymerizable unsaturated carboxylic acid;
    from 20 to 65 parts by weight, per 100 parts by weight of film-forming copolymer, of chlorinated paraffin having 8 to 30 carbon atoms, a number average molecular weight of 200 to 1200 and a chlorination ratio (chlorine content) of from 35 to 75% by weight; and
    zinc flower in an amount of 3 to 500 parts by weight per 100 parts by weight of the film forming copolymer.

9. The antifouling coating composition as claimed in claim 8, wherein at least one of R², R³ and R⁴ has at least 3 carbon atoms.

10. A coating film formed from the antifouling coating composition of any one of claims 1, 2, 3, 4, 8 or 9.

11. An antifouling method for hulls and underwater structures comprising applying the antifouling coating composition of any of claims 1, 2, 3, 4, 8 or 9 to thereby form antifouling films.

12. A hull or an underwater structure having its surface coated with a coating film formed from the antifouling coating composition of any of claims 1, 2, 3, 4, 8 or 9.

13. The antifouling coating composition according to claim 1, wherein the amount of chlorinated paraffin is from 20 to 55 parts, per 100 parts of film-forming copolymer.

14. The antifouling coating composition according to claim 1, wherein the amount of chlorinated paraffin is from 20 to 50 parts, per 100 parts of film-forming copolymer.

15. The antifouling coating composition according to claim 8, wherein the amount of chlorinated paraffin is from 20 to 55 parts, per 100 parts of film-forming copolymer.

16. The antifouling coating composition according to claim 8, wherein the amount of chlorinated paraffin is from 20 to 50 parts, per 100 parts of film-forming copolymer.

17. The antifouling paint composition according to claim 1, which further comprises from 5 to 400 parts by weight, per 100 parts of film-forming copolymer, of zinc flower.

18. The antifouling coating composition of claim 1 wherein said trialkyl ester comprise tributylsilyl (meth) acrylate.

19. The antifouling coating composition of claim 8 wherein said trialkyl ester is represented by the following formula (I):

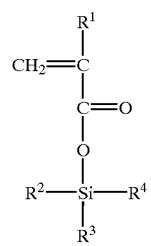

wherein R¹ represents a hydrogen atom or an alkyl group, and each of R², R³ and R⁴, independently, is an alkyl group having 1 to 18 carbon atoms.

20. The antifouling coating composition of claim 19 wherein said structural units comprise tributylsilyl (meth) acrylate.

21. The antifouling coating composition of claim 1 wherein the antifouling agent comprises from about 0.5 to 600 parts by weight of zinc pyrithione and from about 30 to 1200 parts by weight of cuprous oxide, each per 100 parts by weight of said film-forming copolymer.

22. An antifouling coating composition comprising:
    0.5 to 600 parts by weight of zinc pyrithione as antifouling agent;
    100 parts by weight of film forming copolymer having a number average molecular weight in the range of from 1,000 to 50,000, from 20 to 65% by weight of the structural units of which are derived from trialkylsilylester of polymerizable unsaturated carboxylic acid; and
    10 to 65 parts by weight of chlorinated paraffin having from 8 to 30 carbon atoms, a number average molecular weight of 200 to 1,200, and a chlorination ratio of from 35 to 75% by weight.

23. The antifouling coating composition of claim 22 which comprises from 20 to 50 parts by weight of said chlorinated paraffin.

24. The antifouling coating composition of claim 22, further comprising from about 5 to about 400 parts by weight of zinc flower.

25. The antifouling coating composition of claim 22 wherein said trialkyl ester is represented by the following formula (I):

[I]
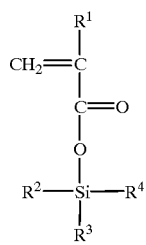
wherein $R^1$ represents a hydrogen atom or an alkyl group, and each of $R^2$, $R^3$ and $R^4$, independently, is an alkyl group having 1 to 18 carbon atoms.
26. The antifouling coating composition of claim 25 wherein said structural units comprise tributylsilyl (meth) acrylate.
* * * * *